(12) United States Patent
Moon et al.

(10) Patent No.: US 11,302,037 B2
(45) Date of Patent: Apr. 12, 2022

(54) ELECTRONIC DEVICE FOR ADAPTIVELY ALTERING INFORMATION DISPLAY AREA AND OPERATION METHOD THEREOF

(71) Applicant: Samsung Electronics Co., Ltd., Gyeonggi-do (KR)

(72) Inventors: Choonkyoung Moon, Gyeonggi-do (KR); Jueun Lee, Gyeonggi-do (KR); Shinjae Jung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2 days.

(21) Appl. No.: 16/718,354

(22) Filed: Dec. 18, 2019

(65) Prior Publication Data

US 2020/0193649 A1   Jun. 18, 2020

(30) Foreign Application Priority Data

Dec. 18, 2018   (KR) .......................... 10-2018-0164298

(51) Int. Cl.
*G06T 11/00* (2006.01)
*G06F 3/01* (2006.01)

(52) U.S. Cl.
CPC .............. *G06T 11/00* (2013.01); *G06F 3/017* (2013.01)

(58) Field of Classification Search
None
See application file for complete search history.

(56) References Cited

U.S. PATENT DOCUMENTS

| 9,791,917 | B2 | 10/2017 | Kamhi et al. | |
| 9,910,506 | B2* | 3/2018 | Spiessl | G06F 3/017 |
| 10,191,564 | B2 | 1/2019 | Gao et al. | |
| 10,318,007 | B2 | 6/2019 | Lee et al. | |
| 2009/0110235 | A1* | 4/2009 | Marti | G06F 3/043 |
| | | | | 382/103 |
| 2009/0153468 | A1* | 6/2009 | Ong | G06F 3/011 |
| | | | | 345/156 |
| 2014/0015785 | A1* | 1/2014 | Sato | G06F 3/0488 |
| | | | | 345/173 |

(Continued)

FOREIGN PATENT DOCUMENTS

| KR | 10-2010-0039194 A | 4/2010 |
| KR | 10-2016-0113592 A | 9/2016 |

(Continued)

OTHER PUBLICATIONS

International Search Report dated Apr. 21, 2020.

*Primary Examiner* — David H Chu
(74) *Attorney, Agent, or Firm* — Cha & Reiter, LLC.

(57) ABSTRACT

A wearable electronic device is disclosed, including a transparent display, a camera, communication circuitry, a memory storing instructions, and at least one processor. The wearable electronic device receives, through the communication circuitry, screen data from the electronic device and displaying the screen data in a first area of the at least one display, while receiving the screen data, detect, using the at least one camera, a presence of a body part holding the electronic device within a field of view of the at least one camera and determine whether the presence of the body part overlaps the first area, in response to detecting overlap of the first area, display the screen data to a second area of the at least one display different from the first area.

19 Claims, 17 Drawing Sheets

(56) References Cited

U.S. PATENT DOCUMENTS

| | | | | |
|---|---|---|---|---|
| 2015/0199167 A1* | 7/2015 | Sugiyama | ............... | G06F 1/163 |
| | | | | 345/2.3 |
| 2015/0295959 A1* | 10/2015 | Lee | ....................... | G06T 19/006 |
| | | | | 709/204 |
| 2015/0302653 A1* | 10/2015 | Algreatly | ................ | G06F 3/041 |
| | | | | 345/633 |
| 2016/0034042 A1* | 2/2016 | Joo | ......................... | G06F 3/017 |
| | | | | 345/633 |
| 2016/0041619 A1* | 2/2016 | Ishiwata | ............... | G06F 3/0304 |
| | | | | 715/857 |
| 2016/0041624 A1* | 2/2016 | Spiessl | ................... | H04N 7/188 |
| | | | | 345/8 |
| 2016/0240149 A1* | 8/2016 | Kim | ...................... | G06F 1/3218 |
| 2017/0076502 A1 | 3/2017 | Chen et al. | | |
| 2017/0213393 A1 | 7/2017 | Fedosov et al. | | |
| 2018/0164589 A1 | 6/2018 | Watanabe et al. | | |
| 2020/0089312 A1* | 3/2020 | Ikeda | ........................ | G06F 3/14 |
| 2020/0090627 A1* | 3/2020 | Saito | .................... | A01K 29/005 |

FOREIGN PATENT DOCUMENTS

| | | |
|---|---|---|
| KR | 10-2017-0037869 A | 4/2017 |
| WO | 2016/194844 A1 | 12/2016 |
| WO | 2017/89699 A1 | 11/2017 |

\* cited by examiner

ELECTRONIC DEVICE FOR ADAPTIVELY ALTERING INFORMATION DISPLAY AREA AND OPERATION METHOD THEREOF

CROSS-REFERENCE TO RELATED APPLICATION

This application is based on and claims priority under 35 U.S.C. § 119 to Korean Patent Application No. 10-2018-0164298, filed on "Dec. 18, 2018", in the Korean Intellectual Property Office, the disclosure of which is incorporated by reference herein in its entirety.

BACKGROUND

Field

The disclosure relates to augmented reality displays in electronic devices, and more particular, to augmented reality including adaptively altering display information based on movement of real-world objects.

Description of Related Art

To provide an enhanced user experience, augmented reality (AR) services are being developed which display information generated by a computer in tandem with a user's view of the real world including real-world objects.

The above information is presented as background information only to assist with an understanding of the present disclosure. No determination has been made, and no assertion is made, as to whether any of the above might be applicable as prior art with regard to the present disclosure.

SUMMARY

To provide the augmented reality service, a wearable device may display a virtual object on a display of the wearable device. Because the virtual object is provided in tandem with a viewing of an external object residing in the real world, the external object can influence the visibility of the virtual object depending on configuration or perspective.

Technological solutions the present disclosure seeks to achieve are not limited to the above-mentioned technological solutions, and other technological solutions not mentioned above would be able to be clearly understood by a person having ordinary skill in the art from the following statement.

A wearable device interlocking with an electronic device of certain embodiments may include: at least one display including a first surface and a second surface opposite the first surface, wherein external light entering the first surface passes out the second surface, and wherein the at least one display is configured to display information on the second surface, at least one camera, communication circuitry, a memory storing instructions, and at least one processor, wherein the instructions are executable by the at least one processor to cause the wearable device to: receive, through the communication circuitry, screen data from the electronic device and displaying the screen data in a first area of the at least one display, while receiving the screen data, detect, using the at least one camera, a presence of a body part holding the electronic device within a field of view of the at least one camera and determine whether the presence of the body part overlaps the first area, in response to detecting overlap of the first area, display the screen data to a second area of the at least one display different from the first area.

A wearable device interlocking with an electronic device of certain embodiments may include at least one display including a first surface and a second surface opposite the first surface, wherein external light entering the first surface passes out the second surface, and wherein the at least one display is configured to display information on the second surface, at least one camera, a memory storing instructions, a communication circuitry, and at least one processor, wherein the instructions are executable by the at least one processor to cause the wearable device to: display a screen in a first area of the at least one display, the displayed screen including at least one virtual object and generated based on screen data received from the electronic device through the communication circuitry, while displaying the screen, detect whether a body part holding the electronic device and captured by the least one camera moves into the first area, and based on detecting the body part moving into the first area, move the at least one virtual object from the first area to a second area of the at least one display.

A wearable device of certain embodiments may include at least one display including a first surface and a second surface opposite the first surface, wherein external light entering the first surface passes out the second surface, and wherein the at least one display is configured to display information on the second surface, at least one camera, a memory storing instructions, and at least one processor, wherein the instructions are executable by the at least one processor to cause the wearable device to: display an augmented reality (AR) object on a first area of the at least one display, the AR object associated with a first real-world external object visible through the at least one display, detect a presence of a second real-world external object distinct from the first real-world external object in the first area where the AR object is displayed, using the at least one camera, and in response to the detecting the presence of the second real-world object in the first area, display the AR object, as associated with the first real-world external object, on a second area of the display area altered from the first area.

A method for operating a wearable device interlocking with an electronic device of certain embodiments may include receiving data about a screen, through a communication circuitry of the wearable device, from the electronic device gripped by part of the body of a user, and while receiving the data about the screen, identifying that a first area of a display area of at least one transparent display of the wearable device is hidden by the part of the body by using at least one camera of the wearable device, and in response to the identifying, displaying the screen in a second area of the display area different from the first area.

A method for operating a wearable device interlocking with an electronic device of certain embodiments may include displaying a screen on at least part of a display area of at least one transparent display of the wearable device based on data received from the electronic device gripped by part of the body of a user, and while displaying the screen on the at least part of the display area, obtaining that the part of the body is moved to a first area of the display area of displaying at least one virtual object included in the screen by using the at least one camera, and in response to the obtaining, moving the at least one virtual object from the first area to a second area of the display area.

A method for operating a wearable device of certain embodiments may include displaying an augmented reality (AR) object of an external object viewed in a display area of at least one transparent display of the wearable device, on a first area of the display area, obtaining another external object distinct from the external object in the first area of displaying the AR object, by using the at least one camera, and in response to the obtaining, display the AR object, as associated with the external object, on a second area of the display area altered from the first area.

DETAILED DESCRIPTION

Figure 1:
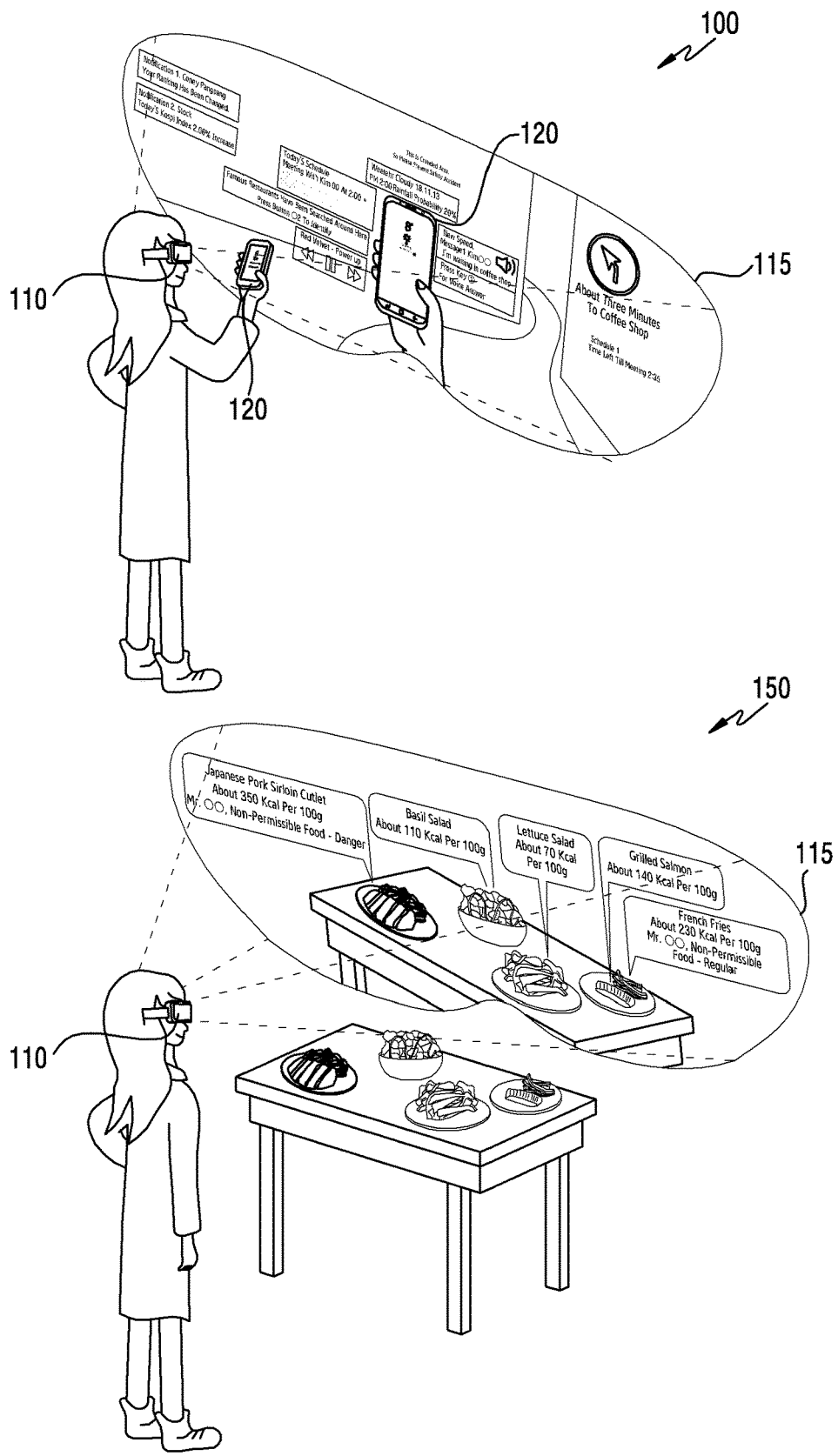
FIG. 1 illustrates an example of environments including a wearable device according to certain embodiments.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 210) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

FIG. 1 illustrates an example of environments including a wearable device according to certain embodiments.

Referring to FIG. 1, the wearable device 110 may be included in an environment 100 or environment 150.

In certain embodiments, the wearable device 110 may be used to provide an augmented reality (AR) service. In certain embodiments, to provide the augmented reality service, the wearable device 110 may include at least one transparent display. Because the at least one transparent display is configured to enable external light going forward a first surface of the at least one transparent display to go through a second surface of the at least one transparent display, the at least one transparent display may display a virtual object, together with an external object residing in the real world. In the present document, the virtual object may be referred to as a visual object, in that the virtual object is acknowledged by a user as well. In certain embodiments, to provide the augmented reality service, the wearable device 110 may include a camera used to recognize the external object, a camera used to trace an eye of a user who wears the wearable device 110, or a combination thereof. In certain embodiments, to provide the augmented reality service, the wearable device 110 may include a communication circuitry. The communication circuitry may be used to acquire recognition information about an external object from an external electronic device (e.g., the electronic device 120), or be used to acquire information for displaying a virtual object from the external electronic device.

In certain embodiments, the wearable device 110 in the environment 100 may be interlocked with the electronic device 120 gripped by a user. In certain embodiments, while being worn by the user, the wearable device 110 in the environment 100 may be interlocked with the electronic device 120 gripped by the user. For example, while being worn by the user, the wearable device 110 in the environment 100 may display, as a virtual object, multimedia content provided from the electronic device 120 gripped by the user, on the display area 115 of the at least one transparent display. The virtual object may be displayed, together with an external object residing in the real world viewed in the display area 115. For example, the wearable device 110 in the environment 100 may provide virtual objects displayed on the display area 115 based on information received from the electronic device 120, together with external objects (e.g., the hand of a user, the electronic device 120, and a road) viewed in the display area 115.

In certain embodiments, the wearable device 110 in the environment 150 may operate independently from the electronic device 120. In certain embodiments, while being worn by the user, the wearable device 110 in the environment 150 may display a virtual object on the display area 115, as associated with an external object residing in the real world viewed in the display area 115. The virtual object may be multimedia content acquired independently from the electronic device 120, unlike the virtual object displayed in the wearable device 110 in the environment 100. The virtual object may include information related with the external object viewed in the display area 115.

Figure 2:
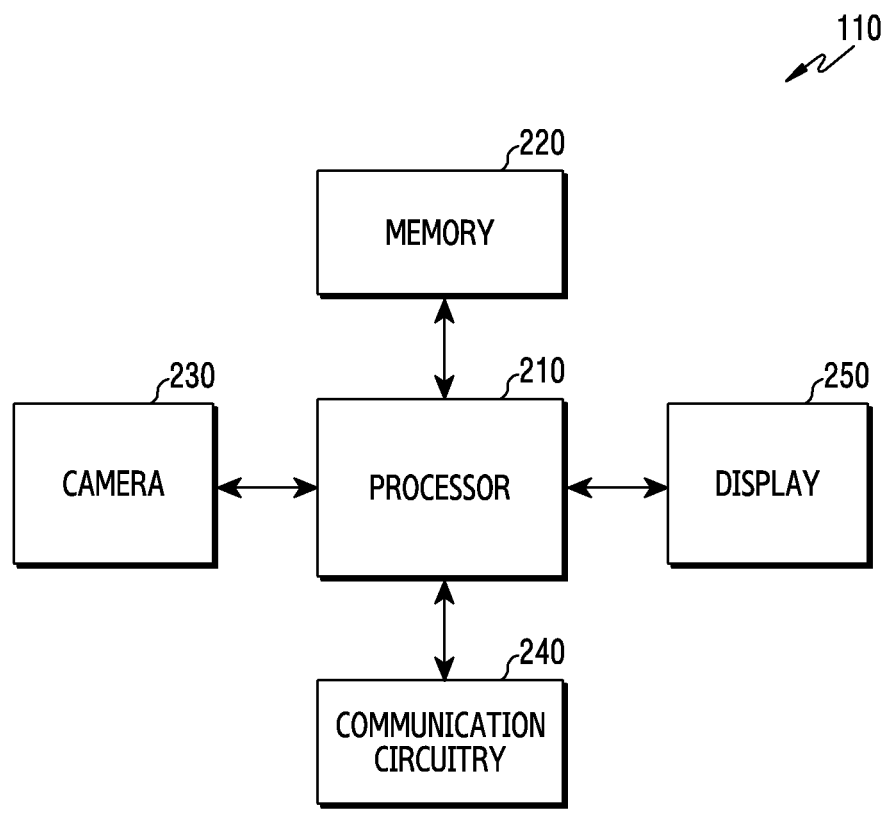
FIG. 2 illustrates an example wearable device according to certain embodiments.

FIG. 2 illustrates an example wearable device according to certain embodiments.

Referring to FIG. 2, the wearable device 110 may include a processor 210, a memory 220, a camera 230, a communication circuitry 240, and a display 250.

The processor 210 may control general operations of the wearable device 110. For example, the processor 210 may record data in the memory 220, and read data recorded in the memory 220. For another example, the processor 210 may acquire an image through the camera 230. For further another example, the processor 210 may transmit a signal to another electronic device (e.g., the electronic device 120) through the communication circuitry 240, or receive a signal from the another electronic device (e.g., the electronic device 120). For yet another example, the processor 210 may display information through the display 250. In accordance with embodiments, the processor 210 may include a plurality of processors. For example, the processor 210 may include an application processor (AP) controlling an upper layer such as an application program, etc., a communication processor (CP) performing control for communication, a display controller for controlling a screen displayed on the display 250, etc.

The processor 210 may be configured to implement procedures and/or methods proposed in the present disclosure.

The memory 220 may store an instruction of controlling the wearable device 110, a control command code, control data, or user data. For example, the memory 220 may store an application, an operating system (OS), middleware, and/or a device driver.

The memory 220 may include at least one or more of a volatile memory or a non-volatile memory. The volatile memory may include a dynamic RAM (DRAM), a static RAM (SRAM), a synchronous DRAM (SDRAM), a phase-change RAM (PRAM), a magnetic RAM (MRAM), a resistive RAM (RRAM), a ferroelectric RAM (FRAM), etc. The non-volatile memory may include a read only memory (ROM), a programmable ROM (PROM), an electrically programmable ROM (EPROM), an electrically erasable ROM (EEROM), a flash memory, etc.

The memory 220 may further include a non-volatile media such as a hard disk drive (HDD), a solid state disk (SSD), an embedded multimedia card (eMMC), and/or a universal flash storage (UFS).

The memory 220 may be operably or operatively coupled with the processor 210.

The camera 230 may be used to acquire an image of an environment viewed in a display area of the display 250. To acquire the image of the environment viewed in the display area of the display 250, the camera 230 may be arranged toward the environment. To acquire the image of the environment viewed in the display area of the display 250, a field of view (FOV) of the camera 230 arranged toward the environment may be configured to cover a wider area than the display area of the display 250, or be configured to cover an area corresponding to the display area of the display 250. To acquire the image of the environment viewed in the display area of the display 250, the field of view (FOV) of the camera 230 arranged toward the environment may be configured to cover a wider area than an area covered by a field of view of a user who wears the wearable device 110, or be configured to cover an area corresponding to the area covered by the field of view of the user. To acquire the image of the environment viewed in the display area of the display 250, the camera 230 arranged toward the environment may include a plurality of cameras. In certain embodiments, to acquire a stereoscopic image, the plurality of cameras may be configured as a pair of cameras. To acquire the stereoscopic image, a direction in which a first camera included in the pair of cameras goes may be the same as a direction in which a second camera included in the pair of cameras goes. To acquire the stereoscopic image, the field of view of the first camera and the field of view of the second camera may have disparity.

The camera 230 may be further used to trace an eye of a user who wears the wearable device 110. For example, the camera 230 may be arranged toward the eye of the user, such that a field of view of the camera 230 covers an area including the eye of the user who wears the wearable device 110.

The camera 230 may be operably or operatively coupled with the processor 210.

The communication circuitry 240 may have various communication functions (for example, cellular communication, Bluetooth, NFC, Wi-Fi, etc.) for communication between the wearable device 110 and at least one external device (e.g., the electronic device 120). In other words, the communication circuitry 240 may establish communication between the wearable device 110 and the at least one external device.

The communication circuitry 240 may be operatively coupled with the processor 210.

The display 250 may include at least one transparent display, wherein a user who wears the wearable device 110 can see the real world through the at least one transparent display. For example, the display 250 may be configured to enable external light going toward a first surface of the at least one transparent display to go through a second surface of the at least one transparent display different from the first surface, and be configured to display information on the second surface. For example, the second surface may be opposite to the first surface. The display 250 may display a graphical user interface (GUI), wherein the user may interact with the wearable device 110.

The display 250 may be operatively coupled with the processor 210.

In certain embodiments, the processor 210 may display at least one virtual object on the display area of the display 250, together with an external object residing in the real world viewed in the display area (e.g., the display area 115 of FIG. 1) of the display 250. In certain embodiments, the at least one virtual object may be displayed on the display area of the display 250, based on data received through the communication circuitry 240 from the electronic device 120. In certain embodiments, the at least one virtual object may be displayed on the display area of the display 250, based on data processed by the processor 210, independently from (or regardless of) the electronic device 120 as well. In certain embodiments, the at least one virtual object may include information related with an external object viewed in the display area of the display 250. In response to including the at least one virtual object and the information related with the external object, the at least one virtual object may be displayed as associated with the external object. For example, in response to including the at least one virtual object and the information related with the external object, the at least one virtual object may be displayed in proximity to the external object or be displayed as at least partially overlapped with the external object. In certain embodiments, the at least one virtual object may include information independent from the external object viewed in the display area of the display 250 as well.

In certain embodiments, the processor 210 may acquire recognition information about an external object residing in the real world viewed in the display area of the display 250. For example, the processor 210 may transmit information about an image including a visual object corresponding to the external object acquired through the camera 230 to another electronic device (e.g., the electronic device 120, a server of providing an image recognition service, etc.) through the communication circuitry 240, and acquire the recognition information about the external object through the communication circuitry 240 from the another electronic device. For another example, the processor 210 may acquire the recognition information about the external object by recognizing the image including the visual object corresponding to the external object without use of the another electronic device.

In certain embodiments, the processor 210 may receive data about a screen through the communication circuitry 240 from the electronic device 120 gripped by part (e.g., the hand of a user) of the body of the user. In certain embodiments, based on the received data about the screen, the processor 210 may display the screen on the display area of the display 250. In certain embodiments, at least part of the screen may include a screen extended from a screen displayed on the display of the electronic device 120. For example, while the electronic device 120 displays a portion of multimedia content on the display of the electronic device 120, the screen displayed on the display area of the display 250 may include a remaining portion of the multimedia content. In certain embodiments, the at least part of the screen may include information non-displayed on the display area of the display the electronic device 120. For example, while the electronic device 120 displays at least one multimedia content on the entire area of the display of the electronic device 120, the screen displayed on the display area of the display 250 may include information (e.g., a notification message responsive to a message received by the electronic device 120 and/or state information of the electronic device 120) independent of the multimedia content. However, an embodiment is not limited to this.

In certain embodiments the processor 210 may receive another data as well as the data about the screen through the communication circuitry 240 from the electronic device 120 as well. For example, the another data may include data about an external size of the electronic device 120, data about a size of the screen, data about an orientation of the electronic device 120 measured from an inertial measurement unit (IMU) sensor, data about an event (e.g., a touch input even, etc.) occurring in the electronic device 120, or a combination thereof.

In certain embodiments, while receiving the data about the screen, the processor 210 may identify that a first area of the display area of the display 250 is hidden by part of the body of a user by using the camera 230. For example, while receiving the data about the screen, the processor 210 may identify that the first area of the display area of the display 250 is hidden by part of the body of the user who grips the electronic device 120 by using the camera 230. For example, the part of the body of the user who grips the electronic device 120 may be viewed in the first area.

In certain embodiments, while receiving the data about the screen, the processor 210 may acquire information about an orientation of the electronic device 120. In certain embodiments, the information about the orientation of the electronic device 120 may be acquired by analyzing an image acquired by using the camera 230. In certain embodiments, the information about the orientation of the electronic device 120 may be received from the electronic device 120 as well. For example, the electronic device 120 may acquire the information about the orientation of the electronic device 120 by using at least one sensor (e.g., a gyro sensor, an acceleration sensor, a touch sensor, a proximity sensor, etc.) of the electronic device 120, and transmit the acquired information about the orientation of the electronic device 120 to the wearable device 110. The wearable device 110 may receive the information about the orientation of the electronic device 120 from the electronic device 120. For example, referring to FIG. 4, by analyzing an image acquired using the camera 230 while information including the display screen is received, or analyzing the information about the orientation of the electronic device 120 received from the electronic device 120, the processor 210 may identify that the orientation of the electronic device 120 included in the display area of the display 250 is a portrait mode (or vertical mode). For another example, referring to FIG. 5, by analyzing an image which is acquired using the camera 230 while the information about the screen is received, or analyzing the information about the orientation of the electronic device 120 received from the electronic device 120, the processor 210 may identify that the orientation of the electronic device 120 viewed in the display area of the display 250 is a landscape mode (or horizontal mode).

In certain embodiments, the processor 210 may identify a relative orientation relationship or position relationship between the wearable device 110 and the electronic device 120, based on the analysis of the image and the analysis of the information about the orientation as well.

In certain embodiments, the processor 210 may identify a boundary area of the electronic device 120 in an image acquired using the camera 230, based on the information about the orientation of the electronic device 120. For example, referring to FIG. 4, the processor 210 may identify a boundary area 405 of the electronic device 120 in the image acquired using the camera 230, based on the information about the orientation of the electronic device 120. For another example, referring to FIG. 5, the processor 210 may identify a boundary area 505 of the electronic device 120 in the image acquired using the camera 230, based on the information about the orientation of the electronic device 120.

In certain embodiments, by using the camera 230, the processor 210 may identify an area where the electronic device 120 comes in contact with an external object (e.g., part of the body of a user) from a boundary area of the electronic device 120. For example, by using the camera 230, the processor 210 may identify that a shape of the boundary area of the electronic device 120 is altered due to the contact with the external object. The processor 210 may first search for the part of the body of the user in an area adjacent to the contact area with the external object, based on identifying that the shape of the boundary area of the electronic device 120 is altered due to the contact with the external object.

Figure 4:
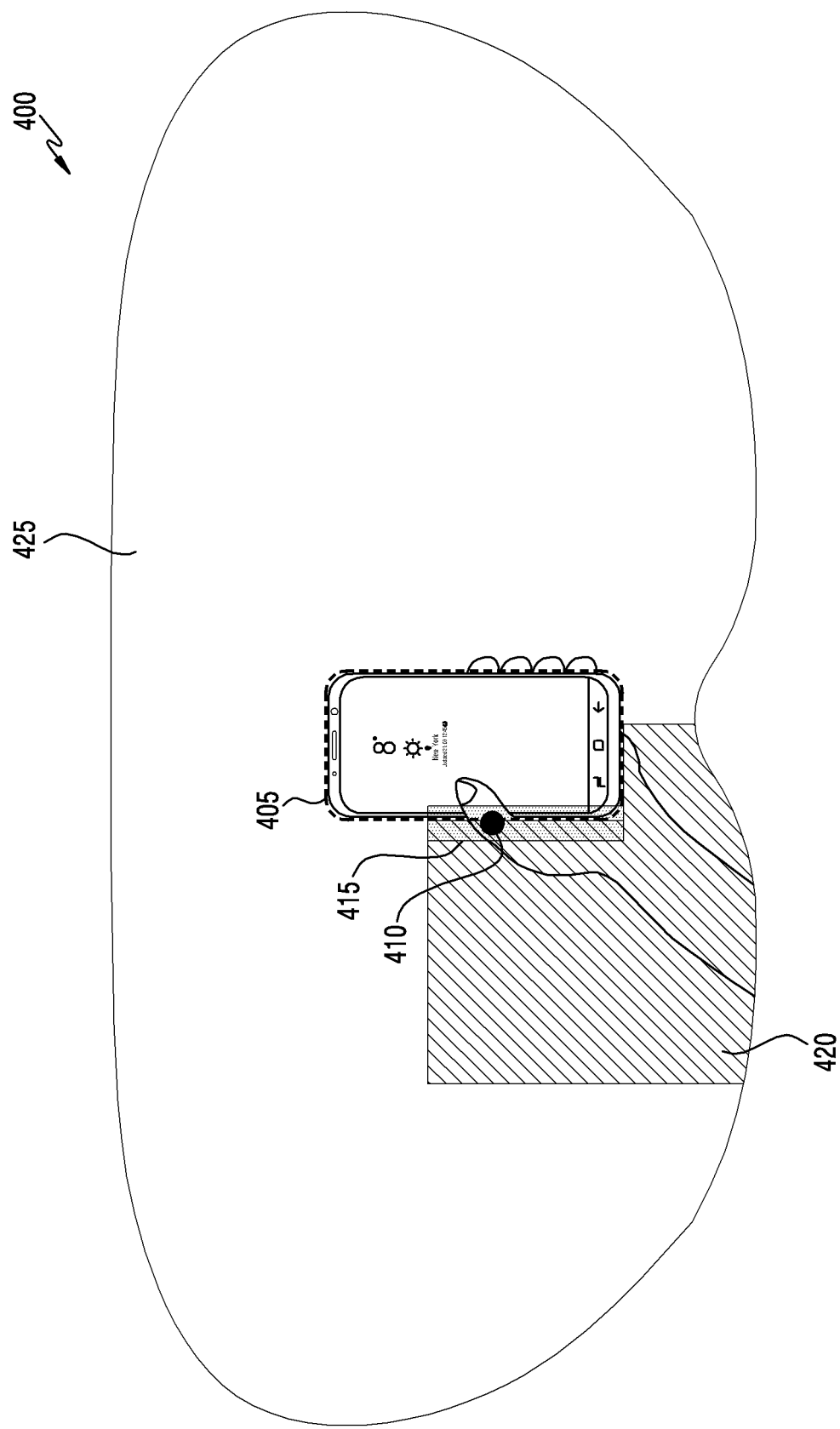
FIG. 4 illustrates an example of a first area of a display area of a display of a wearable device according to certain embodiments.

For example, referring to FIG. 4, the processor 210 may identify an area 410 in which the part of the body of the user comes in contact with the electronic device 120, based on identifying that the shape of the boundary area 405 is altered due to the part of the body of the user. For another example, referring to FIG. 5, the processor 210 may identify an area 510 in which the part of the body of the user comes in contact with the electronic device 120, based on identifying that the shape of the boundary area 505 is altered due to the part of the body of the user. By identifying the contact area based on the alteration of the shape of the boundary area and searching for the part of the body of the user based on the contact area, the processor 210 may search for the part of the body more efficiently, as compared to searching for and attempting to detect a part of the user's body included in a field of view of the camera 230.

In certain embodiments, based on the identified area, the processor 210 may recognize a state of the part of the body of the user; such as a present holding or grip of the electronic device 120. For example, the processor 210 may recognize whether the present state includes gripping the electronic device 120 with one hand or with both hands. In response to recognizing a single-handed grip, the processor 210 may further recognize whether the single-handed grip is effected with the left hand or the right hand. For example, referring to FIG. 4, by confirming a feature of the body of the user around the identified area 410 based on the distribution of the identified area 410, the processor 210 may recognize that the electronic device 120 is gripped by the left hand of the user. For another example, referring to FIG. 5, by confirming a feature of the body of the user around the identified area 510 based on the distribution of the identified area 510, the processor 210 may recognize that the electronic device 120 viewed in the display area of the display 250 is gripped with both hands of the user.

In certain embodiments, in response to a failure to identify the area area, the processor 210 may terminate operations related with the identifying of the display area to conserve power.

In certain embodiments, the processor 210 may identify the first area of the display area hidden by the part of the body, based on the state of the recognized part of the body. For example, the processor 210 may identify, as a reference area, a part of the boundary area of the electronic device 120, based on the state of the recognized part of the body, and identify a part of the display area extended from the identified reference area, as the first area estimated to be hidden by the part of the body of the user. In certain embodiments, the first area may mean an area where the displaying of information is restricted. For example, referring to FIG. 4, the processor 210 may identify a part of the boundary area 405, as a reference area 415, based on that the electronic device 120 viewed in the display area of the display 250 is gripped with the left hand of the user. In certain embodiments, the reference area 415 may be used to implement a first area 420 as a part of the display area of the display 250 estimated to be hidden with part of the left hand and left arm of the user. The processor 210 may identify, as the first area 420, a partial area of the display area extended from the reference area 415. For another example, referring to FIG. 5, the processor 210 may identify a part of a boundary area 505 as a reference area 515, based on recognizing that the electronic device 120 viewed in the display area of the display 250 is gripped with both hands of the user. In certain embodiments, the reference area 515 may be used to implement a first area 520 as a part of the display area of the display 250 estimated to be hidden by part of both hands and both arms of the user. The processor 210 may identify, as the first area 520, a partial area of the display area extended from the reference area 515.

In certain embodiments, the processor 210 may identify a second area of the display area of the display 250 different from the identified first area. For example, the processor 210 may identify the second area of the display area of the display 250, as an area for displaying information, based on the identified first area. For example, referring to FIG. 4, the processor 210 may identify a remaining area excepting the first area 420, as a second area 425, in the display area 400 of the display. For another example, referring to FIG. 5, the processor 210 may identify a remaining area excepting the first area 520, as a second area 525, in the display area 500 of the display.

In certain embodiments, the processor 210 may display the screen on the identified second area. For example, in response to the electronic device 120 implementing the data about the screen with criterion of the entire display area of the display 250, the processor 210 may regenerate the data about the screen received from the electronic device 120 with criterion of the second area of the display area, and display the screen on the identified second area based on the regenerated data. For another example, in response to the electronic device 120 implementing the data about the screen with criterion of the entire display area of the display 250, the processor 210 may request the electronic device 120 to regenerate the data about the screen with criterion of the second area of the display area through the communication circuitry 240 and, in response to the request, receive the data about the screen regenerated by the electronic device 120 through the communication circuitry 240 from the electronic device 120, and display the screen on the second area based on the received data. However, an embodiment is not limited to this.

Figure 5:
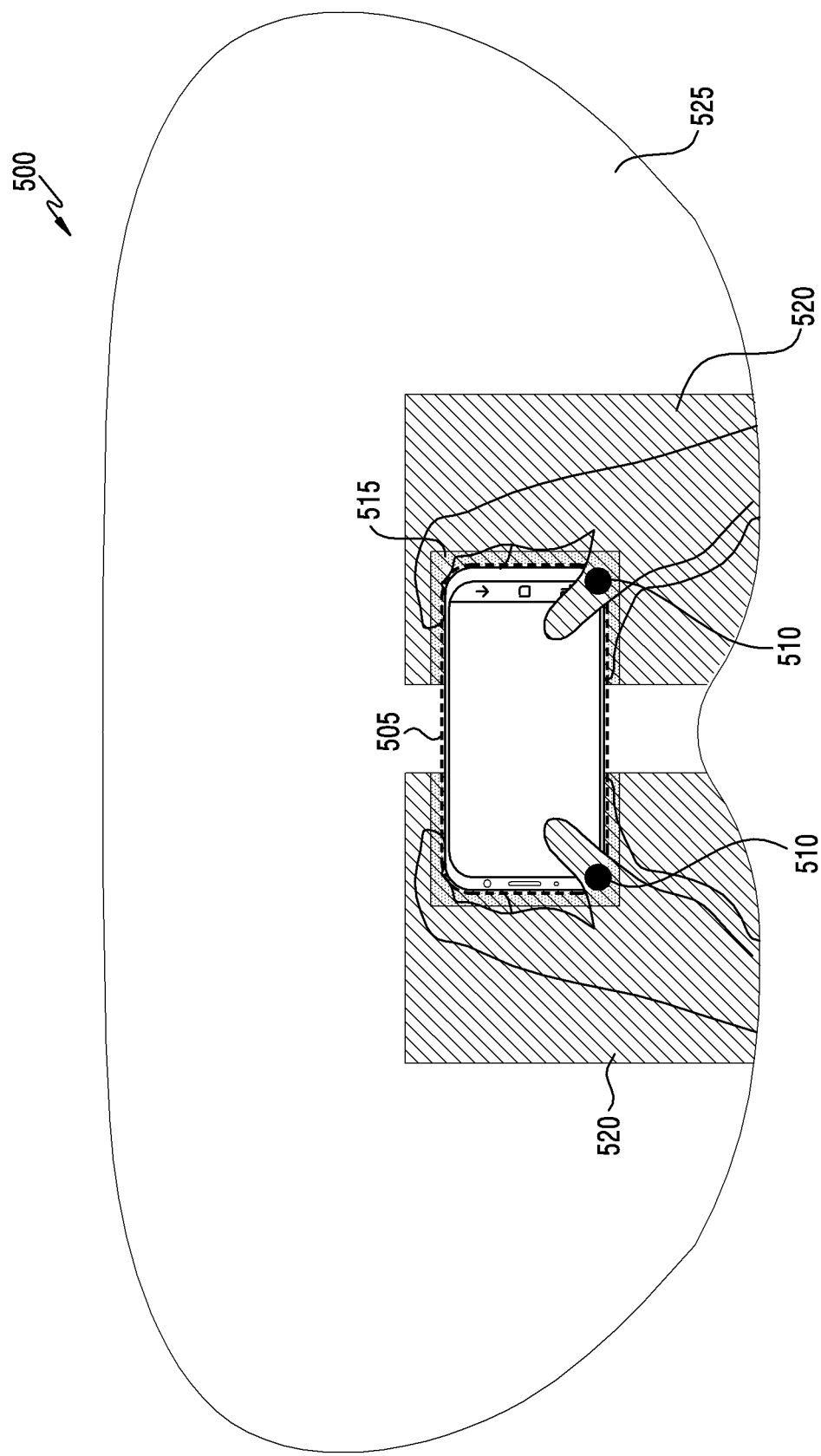
FIG. 5 illustrates another example of a first area of a display area of a display of a wearable device according to certain embodiments.

FIG. 4 and FIG. 5 illustrate examples in which the processor 210 sets the first areas 420 and 530 as the areas for restricting the displaying of information, but the first areas 420 and 520 may be set as areas having other functions as well. For example, the first area estimated to be hidden by part of the body of the user may be set as an area for displaying a visual object having lower priority order than the second area. For another example, the first area estimated to be hidden by the part of the body of the user may be set as an area for displaying a visual object having at least one color which is identified based on a color of the part of the body of the user as well.

In certain embodiments, while displaying the screen on the second area, the processor 210 may confirm whether a state of the part of the body of the user who grips the electronic device 120 is altered. For example, while displaying the screen on the second area, the processor 210 may confirm whether the hand of the user who grips the electronic device 120 is altered from the left hand to the right hand. For another example, while displaying the screen on the second area, the processor 210 may confirm whether the hand of the user who grips the electronic device 120 is altered from one hand to both hands. For further another example, while displaying the screen on the second area, the processor 210 may confirm whether the hand of the user who grips the electronic device 120 is removed from the display area of the display 250.

In certain embodiments, based on confirming that the state of the part of the body of the user who grips the electronic device is altered while the screen is displayed on the second area, the processor 210 may re-identify the first area, and alter the second area based on the re-identified first area. The processor 210 may display the screen on the altered second area.

In certain embodiments, while displaying the screen on the second area, the processor 210 may identify whether a user input to a screen displayed on the display of the electronic device 120 or a screen displayed on the second area is received. In certain embodiments, based on identifying that the user input to the screen displayed on the display of the electronic device 120 or the screen displayed on the second area is received, the processor 210 may re-identify the first area and, based on the re-identified first area, may alter the second area, and may display the screen on the altered second area. For example, referring to FIG. 6, while displaying a first screen 610 on the display of the electronic device 120, the processor 210 may display a second screen 620 extended from the first screen 610 on a part of a second area 641. While displaying the first screen 610 on the display of the electronic device 120 and displaying the second screen 620 extended from the first screen 610 on the part of the second area 641, the processor 210 may obtain an input 630 for scrolling the first screen 610 or an input 635 for scrolling the second screen 620. In certain embodiments, the input 630 or the input 635 may be triggered by another part (e.g., the right hand) of the body of the user. In certain embodiments, the input 630 may be obtained based on data received from the electronic device 120, or be obtained using the camera 230. In certain embodiments, the input 635 may be obtained using the camera 230. In certain embodiments, while obtaining the input 630 or the input 635, the processor 210 may alter the first area for restricting the displaying of information, from an area 637 to the area 637 and an area 639. In response to the user triggering the input 630 or the input 635 by using another part (e.g., the right hand) of the body distinct from part (e.g., the left hand) of the body who grips the electronic device 120, the display area of the display 250 can be additionally hidden by the another part of the body, so the processor 210 may alter the first area from the area 637 to the area 637 and the area 639. The processor 210 may implement the altered second area 641 based on the altered first area, and display the screen on the altered second area 641.

In certain embodiments, the processor 210 may identify a display position of at least one visual object among a plurality of visual objects included in the screen displayed on the second area. In certain embodiments, the at least one visual object may be identified as an object for providing information distinct from remaining visual objects included in the screen displayed on the second area as well. In certain embodiments, the at least one visual object may be identified as an object provided by another application distinct from an application of providing the remaining visual objects included in the screen displayed on the second area as well. However, an embodiment is not limited to this. In certain embodiments, in response to the electronic device 120 being gripped by one hand of a user, the processor 210 may identify a position of displaying the at least one visual object, as a partial area of the second area close to the other hand distinct from the hand gripping the electronic device 120.

Figure 6:
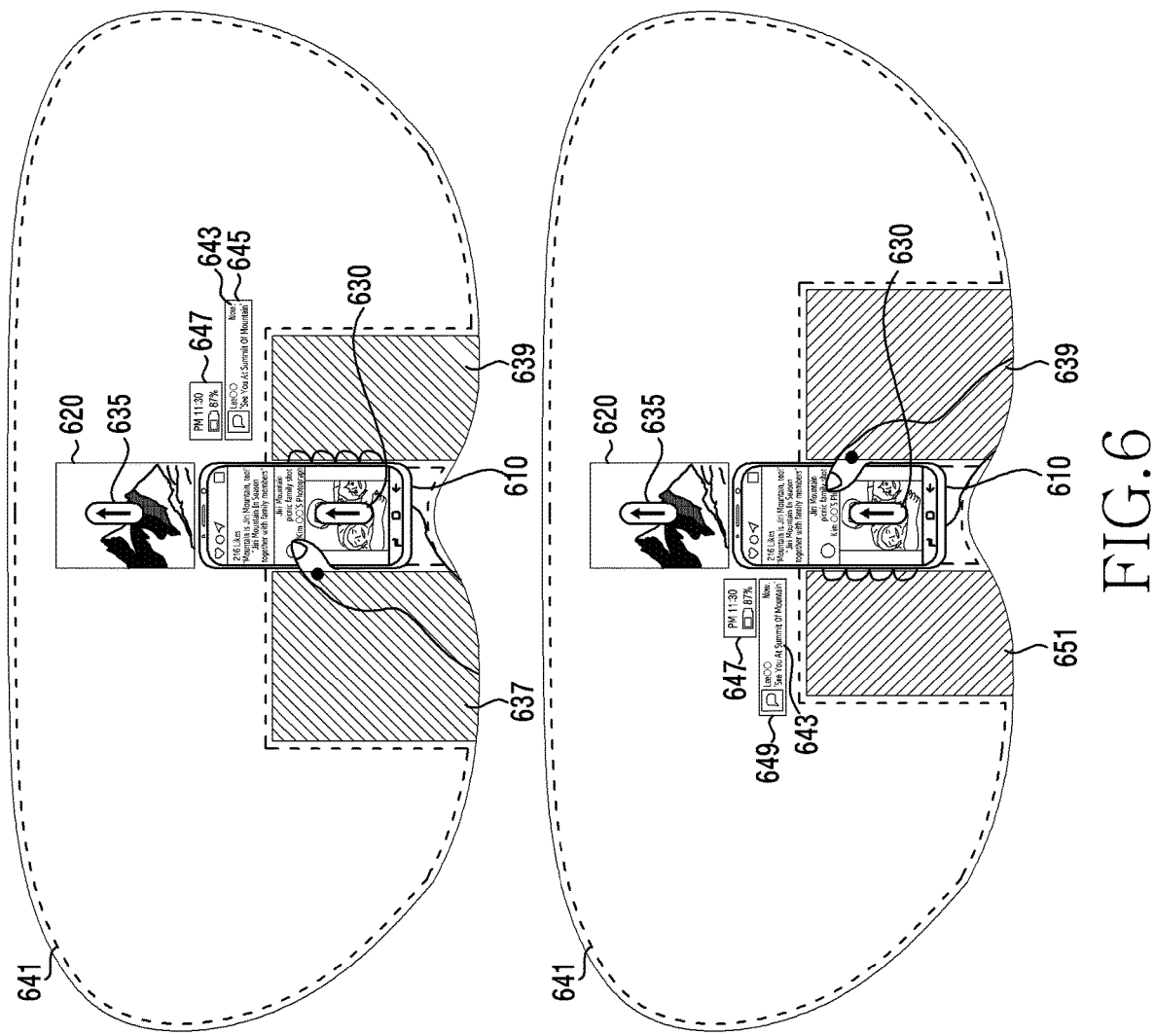
FIG. 6 illustrates a further another example of a first area of a display area of a display of a wearable device according to certain embodiments.

For example, referring to FIG. 6, the processor 210 may identify that a display position of a notification message 643 among the plurality of visual objects displayed on the second area 641 is in an area 645 close to the right hand not gripping the electronic device 120. In certain embodiments, the area 645 may be arranged over or on an area 639 wherein the area 645 can receive a user input triggered by the right hand not gripping the electronic device 120. In certain embodiments, to improve the visibility of the first screen 610 displayed on the display of the electronic device 120, state information 647 of the electronic device 120 may be further displayed on a part of the second area 641.

For another example, referring to FIG. 6, the processor 210 may identify that the display position of the notification message 643 among the plurality of visual objects displayed on the second area 641 is in an area 649. In certain embodiments, the area 649 may be arranged over or on an area 651 that is a part of the first area wherein the area 649 can receive a user input triggered by the left hand not gripping the electronic device 120. In certain embodiments, to improve the visibility of the first screen 610 displayed on the display of the electronic device 120, state information 647 of the electronic device 120 may be further displayed on a part of the second area 641.

In certain embodiments, in response to the electronic device 120 being gripped by both hands of a user, the processor 210 may identify that a position of displaying the at least one visual object is in a partial area of the second area close to a position of the hand with which the user mainly triggers an input. In certain embodiments, the position of the hand with which the user mainly triggers the input may be identified from data learned by analyzing an image which is acquired using the camera 230 and includes a visual object corresponding to the hand of the user triggering the input.

In certain embodiments, the processor 210 may alter a position of at least one visual object among a plurality of visual objects included in the screen, based on obtaining that part of the body of a user who grips the electronic device 120 is altered into another part of the body while the screen is displayed on the second area.

For example, referring to FIG. 6, while displaying the notification message 643 on the area 645, the processor 210 may identify that the hand gripping the electronic device 120 is altered from the left hand to the right hand, by using the camera 230. In response to the identifying, the processor 210 may display the notification message 643 on the area 649 altered from the area 645. Altering from the area 645 to the area 649 may be identified while the regenerating of the first area and the second area is performed in response to identifying that the hand gripping the electronic device 120 is altered from the left hand to the right hand.

Figure 7:
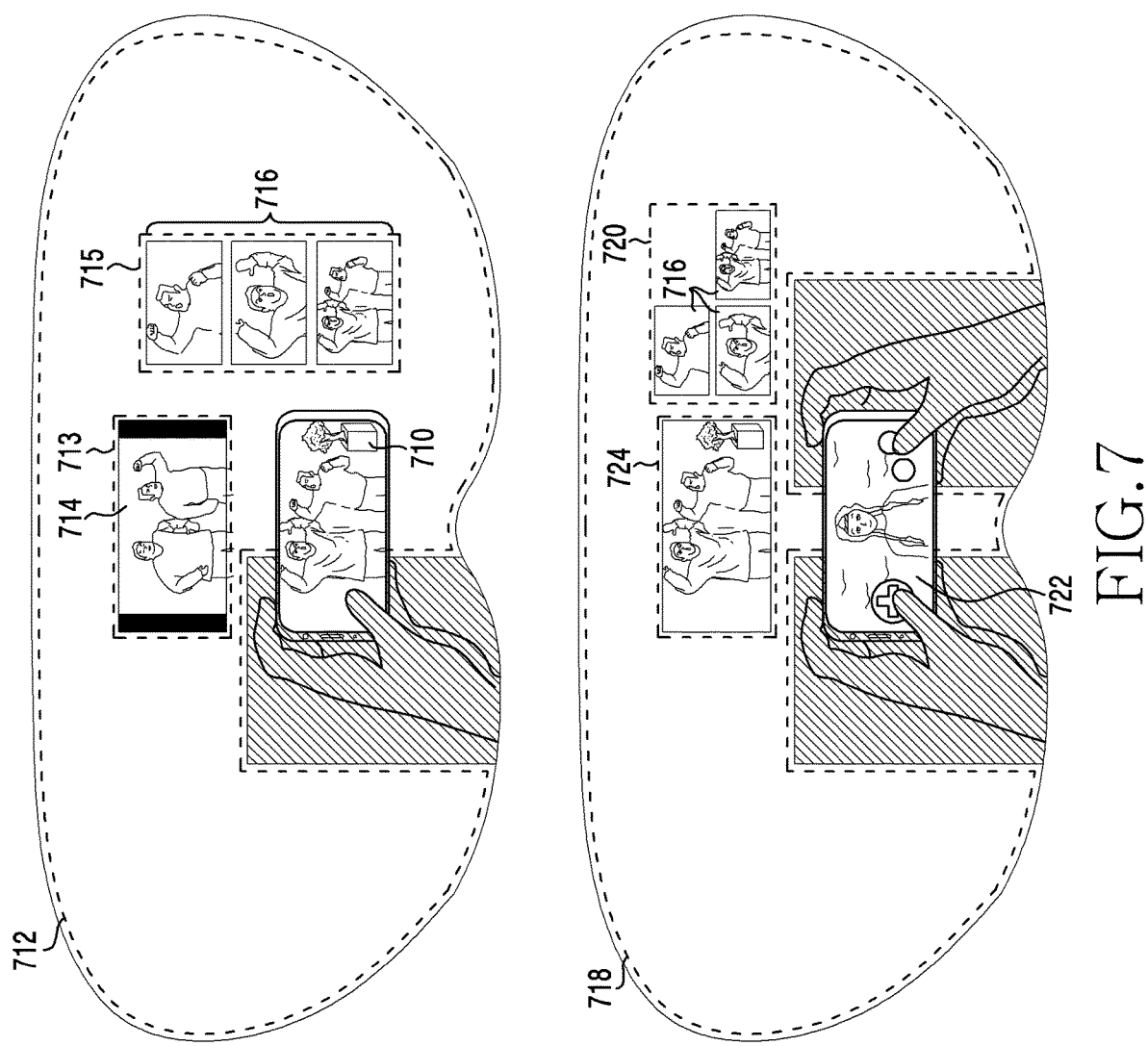
FIG. 7 illustrates an example of processing a visual object in a wearable device according to certain embodiments.

For another example, referring to FIG. 7, while displaying a first screen 710 on the display of the electronic device 120 and displaying a second screen 714, which has been displayed on the display of the electronic device 120 directly previous to the first screen 710, on an area 713 of a second area 712, and displaying at least one screen 716 related with the first screen 710 on an area 715 of the second area 712, the processor 210 may identify that the hand gripping the electronic device 120 is altered from the left hand to both hands, by using the camera 230. In response to the identifying, the processor 210 may regenerate the first area and, based on the regenerated first area, may alter the second area 712 into a second area 718. The processor 210 may display the at least one screen 716, on an area 720 of the second area 718 altered from the area 715 of the regenerated second area 712. In certain embodiments, the arrangement of the at least one screen 716 may be altered according to the alteration from the area 715 to the area 720.

On the other hand, based on identifying that the screen displayed on the display of the electronic device 120 is altered from the first screen 710 to a third screen 722, the processor 210 may display the first screen 710, which has been displayed previous to the third screen 722, on an area 724 of the second area 718. In certain embodiments, like the area 713, an area 724 may be arranged over or on the electronic device 120 viewed in the second area 718. However, an embodiment is not limited to this.

In certain embodiments, the processor 210 may identify a display position of a visual object according to the type of the visual object displayed on the second area. For example, the processor 210 may identify whether to alter the display position of the visual object according to the type of the visual object displayed on the second area. For example, in response to the visual object displayed on the second area being an executable object capable of receiving a user input, the processor 210 may alter the display position of the visual object based on alteration of a grip state of the electronic device 120. For another example, in response to the visual object displayed on the second area being an un-executable object not requiring receiving a user input, the processor 210 may maintain the display position of the visual object regardless of alteration of the grip state of the electronic device 120.

In certain embodiments, the processor 210 may identify a display position of at least one visual object capable of receiving a user input among a plurality of visual objects included in the screen displayed on the second area. For example, the processor 210 may maintain display positions of remaining objects (e.g., un-executable objects) not requiring receiving a user input among the plurality of visual objects, and alter the display position of the at least one visual object into a position corresponding to part of the body triggering the user input. In other words, the processor 210 may identify the at least one visual object capable of receiving the user input among the plurality of visual objects, and alter the display position of the identified at least one visual object unlike the remaining visual objects. For example, in response to the electronic device 120 being gripped by one hand of a user, the processor 210 may identify that a position of displaying the at least one visual object capable of receiving the user input is in a partial area of the second area close to the other hand distinct from the hand gripping the electronic device 120. However, an embodiment is not limited to this.

Figure 8:
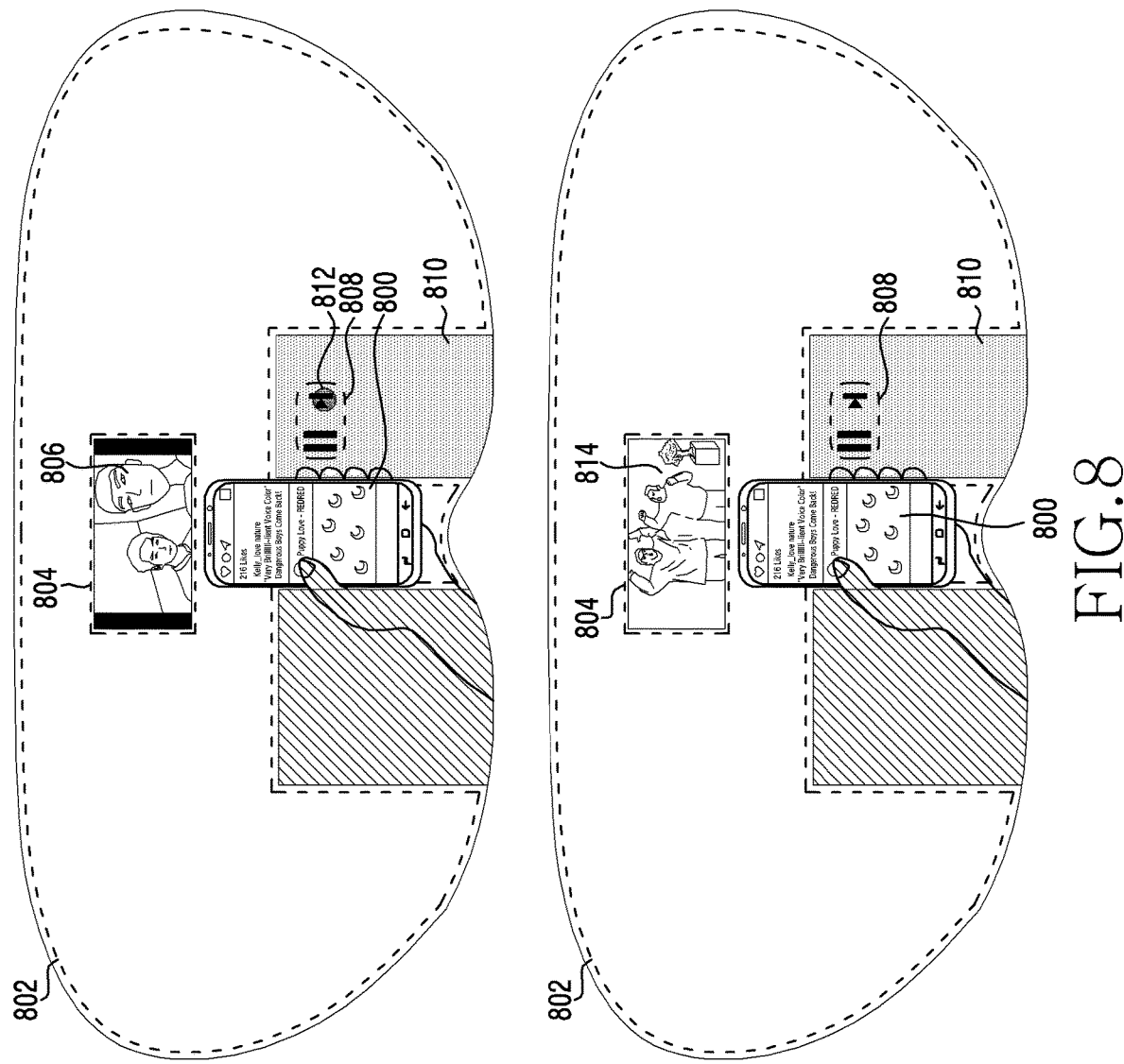
FIG. 8 illustrates another example of processing a visual object in a wearable device according to certain embodiments.

For further another example, referring to FIG. 8, while a web browser 800 is displayed on the display of the electronic device 120 gripped by the left hand of a user and a movie 806 played back through the web browser 800 is displayed on an area 804 of a second area 802, the processor 210 may identify that a display position of at least one visual object 808, which will be displayed, capable of controlling the movie 806 is in an area 810 being an area close to the right hand of the user. Based on the identifying, while displaying the web browser 800 on the display of the electronic device 120 gripped by the left hand of the user and displaying the movie 806 played back through the web browser 800 on the area 804 of the second area 802, the processor 210 may display the at least one visual object 808 on the area 810 of the second area 802. While displaying at least one visual object 808 on the area 810, the processor 210 may obtain a user input 812 to the at least one visual object 808 by using the camera 230. For example, the user input 812 may be a gesture input triggered by the right hand of the user. For another example, the user input 812 may be that an eye of the user stays on the at least one visual object 808 during a specified time. However, an embodiment is not limited to this.

Based on obtaining the user input 812, the processor 210 may alter the movie 806 displayed on the area 804 of the second area 802, into another movie 814. For example, in response to obtaining the user input 812, the processor 210 may transmit information about the user input 812 to the electronic device 120 through the communication circuitry 240. Based on data about the another movie 814 received through the communication circuitry 240 from the electronic device 120, the processor 210 may display the movie 814 on the area 804 of the second area 802. For another example, in response to obtaining the user input 812, the processor 210 may request the data about the another movie 814 next the movie 806 to the server through the communication circuitry 240 based on information about a server of the web browser 800 received from the electronic device 120, and display the movie 814 on the area 804 of the second area 802 based on the data about the another movie 814 received through the communication circuitry 240 from the server. However, an embodiment is not limited to this.

Figure 9:
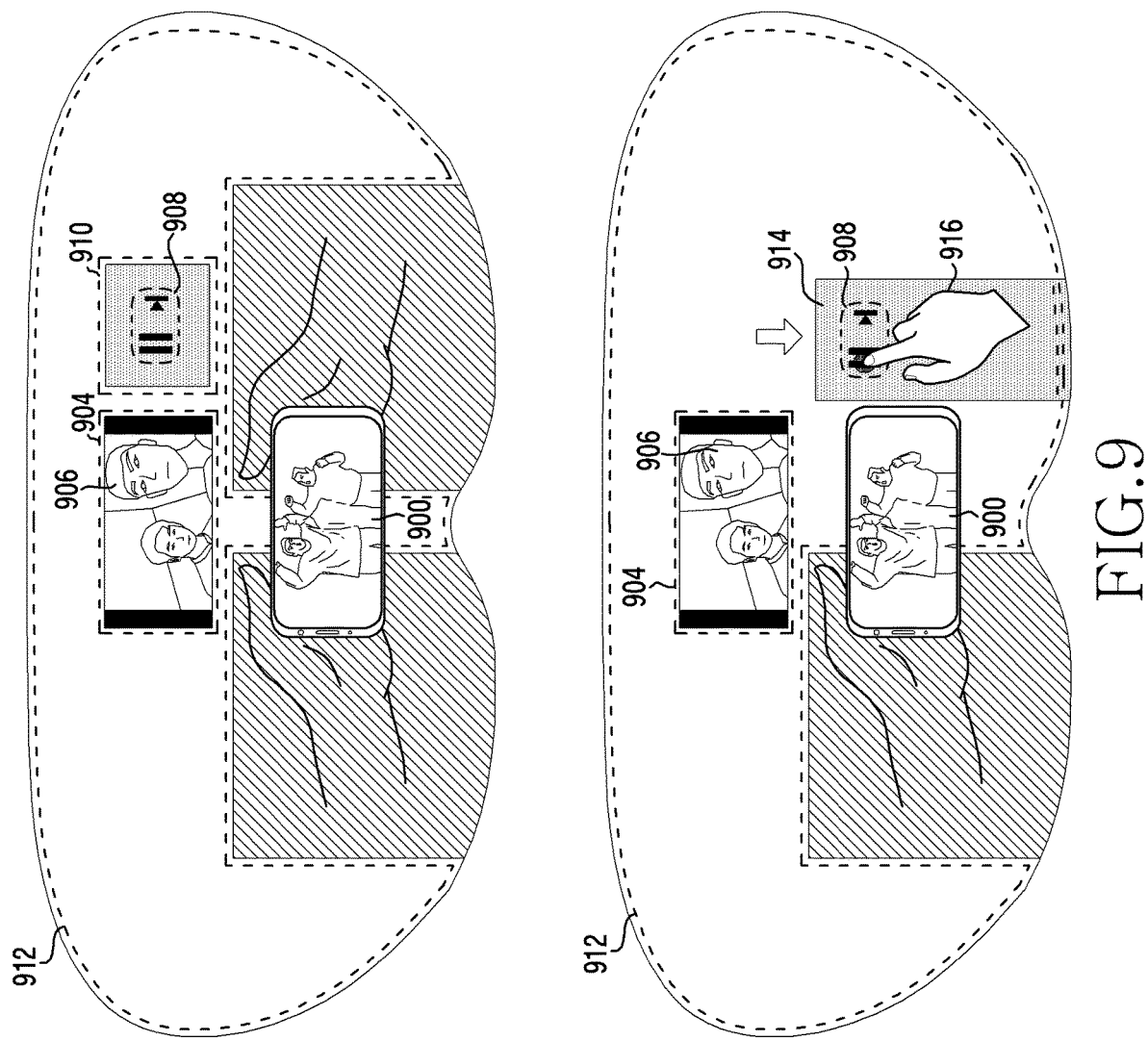
FIG. 9 illustrates a further another example of processing a visual object in a wearable device according to certain embodiments.

For yet another example, referring to FIG. 9, while a first movie 900 is displayed on the display of the electronic device 120 gripped by both hands of a user and a second movie 906 is displayed on an area 904 of a second area 902, the processor 210 may identify that a display position of at least one visual object 908, which will be displayed, capable of controlling the second movie 906 is in an area 910 being an area close to the right hand of the user. Identifying that the at least one visual object 908 is in the area 910 being the area close to the right hand of the user may be based on a use pattern of a user of the wearable device 110 and the electronic device 120. For example, the use pattern of the user may be obtained statistically by obtaining an orientation of the electronic device 120 and part of the body of the user who comes in contact with the electronic device 120 at reception of a touch input. While displaying the first movie 900 on the display of the electronic device 120 gripped by the both hands of the user and displaying the second movie 906 on the area 904 of the second area 902, the processor 210 may display the at least one visual object 908 on the area 910. While displaying the at least one visual object 908 on the area 910, the processor 210 may identify that the right hand among the both hands gripping the electronic device 120 is isolated from the electronic device 120 by using the camera 230. In response to the identifying, the processor 210 may alter the second area 902 into a second area 912, and alter the area 910 displaying the at least one visual object 908 into an area 914 of the altered second area 912. While displaying the at least one visual object 908 on the altered area 914, the processor 210 may obtain a user input 916 by using the camera 230. In response to obtaining the user input 916, the processor 210 may pause the playback of the second movie 906 that is being played back. For example, in response to obtaining the user input 916, the processor 210 may transmit information about the user input 916 to the electronic device 120 through the communication circuitry 240, and may pause the second movie 906 based on data about a function corresponding to the user input 916 received through the communication circuitry 240 from the electronic device 120.

Figure 10:
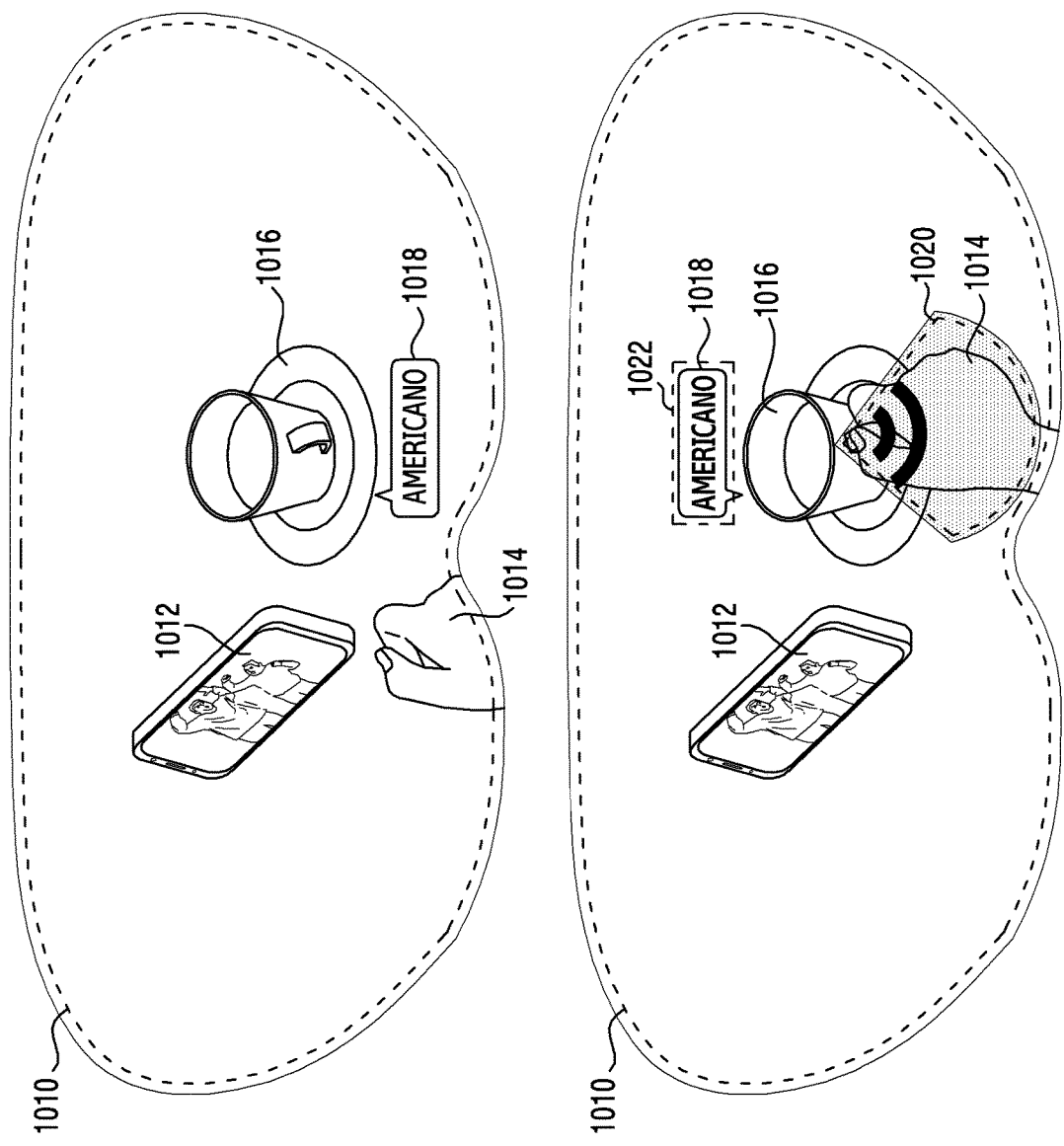
FIG. 10 illustrates an example of processing a visual object in a wearable device operating independently from an electronic device according to certain embodiments.

In certain embodiments, while the wearable device 110 operates independently from the electronic device 120, the processor 210 may identify a position for displaying at least one visual object provided together with an external object residing in the real world, based on a position of another external object distinct from the external object. In various embodiment, the another external object may be part of the body of a user who wears the wearable device 110. In certain embodiments, the another external object may be an object newly entering the display area of the display 250 as well. In certain embodiments, the processor 210 may display, on the display area of the display 250, at least one visual object including information related with the external object viewed in the display area of the display 250. Because the at least one visual object includes the information related with the external object, the at least one visual object may be displayed on the display area of the display 250 as associated with the external object. In certain embodiments, while displaying the at least one visual object as associated with the external object, the processor 210 may identify that the another external object is overlapped with at least a part of an area of displaying the at least one visual object, by using the camera 230. In response to the identifying, the processor 210 may move the at least one visual object to another area of the display area spaced apart from the another external object. For example, referring to FIG. 10, the processor 210 may display a visual object 1018 related with an external object 1016 on a display area 1010, together with an external object 1012, an external object 1014, and/or the external object 1016 residing in the real world viewed in the display area 1010. While displaying the visual object 1018 related with the external object 1016 on the display area 1010, together with the external object 1012, the external object 1014, and/or the external object 1016 residing in the real world viewed in the display area 1010, the processor 210 may identify that the external object 1014 is overlapped with at least a part of an area of displaying the at least one visual object 1018. In response to the identifying, the processor 210 may move the at least one visual object 1018 to another area 1022 spaced apart from an area 1020 occupied by the external object 1014. The at least one visual object 1018 moved to the another area 1022 may be displayed as associated with the external object 1016, like before being moved to the another area 1022.

As described above, the wearable device 110 of certain embodiments may enhance the visibility of a visual object, by adaptively altering a position of the visual object (or a virtual object) displayed on the display area of the display 250 of the wearable device 110 based on a state of an external object viewed in the display area of the display 250 of the wearable device 110 or a position movement of the external object viewed in the display area of the display 250 of the wearable device 110.

Figure 3:
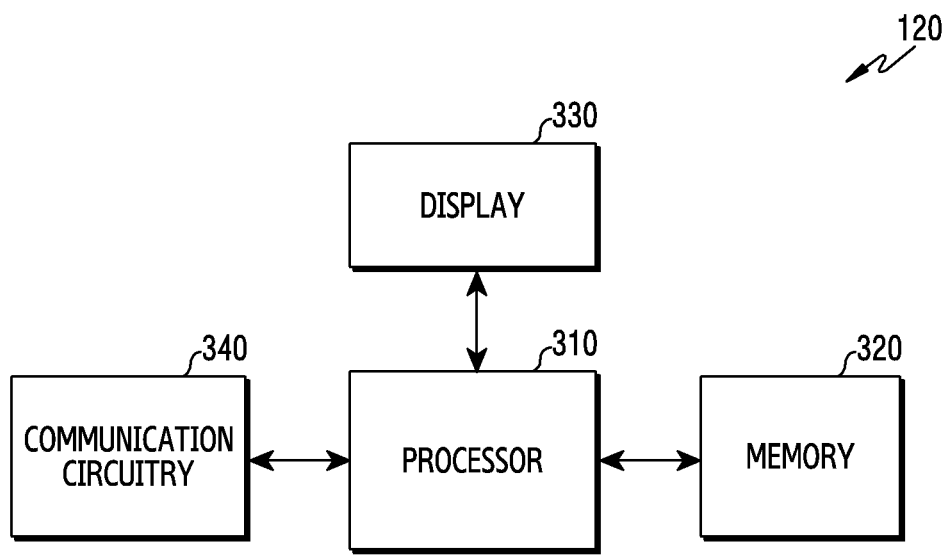
FIG. 3 illustrates an example electronic device according to certain embodiments.

FIG. 3 illustrates an example electronic device according to certain embodiments.

Referring to FIG. 3, the electronic device 120 may include a processor 310, a memory 320, a display 330, and a communication circuitry 340.

The processor 310 may control general operations of the electronic device 120. For example, the processor 310 may record data in the memory 320, and read data recorded in the memory 320. For another example, the processor 310 may display information through the display 330. For further another example, the processor 310 may transmit a signal to another electronic device (e.g., the wearable device 110) through the communication circuitry 340, or receive a signal from another electronic device (e.g., the wearable device 110). In accordance with embodiments, the processor 310 may include a plurality of processors. For example, the processor 310 may include an application processor (AP) controlling an upper layer such as an application program, etc., a communication processor (CP) performing control for communication, a display controller for controlling a screen displayed on the display 330, etc.

The processor 310 may be configured to implement procedures and/or methods proposed in the present disclosure.

The memory 320 may store an instruction controlling the electronic device 120, a control command code, control data, or user data. For example, the memory 320 may store an application, an operating system (OS), middleware, and/or a device driver.

The memory 320 may include at least one or more of a volatile memory or a non-volatile memory. The volatile memory may include a dynamic RAM (DRAM), a static RAM (SRAM), a synchronous DRAM (SDRAM), a phase-change RAM (PRAM), a magnetic RAM (MRAM), a resistive RAM (RRAM), a ferroelectric RAM (FRAM), etc. The non-volatile memory may include a read only memory (ROM), a programmable ROM (PROM), an electrically programmable ROM (EPROM), an electrically erasable ROM (EEROM), a flash memory, etc.

The memory 320 may further include a non-volatile media such as a hard disk drive (HDD), a solid state disk (SSD), an embedded multimedia card (eMMC), and/or a universal flash storage (UFS).

The memory 320 may be operably or operatively coupled with the processor 310.

The display 330 may be a liquid crystal display (LCD) or a light emitting diode (LED) display. The display 330 may display various types of information (for example, multimedia, text data, etc.) to a user. For example, the display 330 may display a graphical user interface (GUI) wherein a user can interact with the electronic device 120.

The display 330 may be implemented in various forms. For example, the display 330 may be implemented as multiple displays including a plurality of displays. For another example, the display 330 may be implemented as an edge display which includes a planar portion and at least one curved portion extending from the planar portion as well. For further another example, the display 330 may be implemented as a foldable display as well. However, an embodiment is not limited to this.

To receive a touch input, the display 330 may be implemented as a touch screen as well. For example, the touch input may include at least one of a single tap input, a double tap input, a hovering input, a hold and release input, or a drag and drop input.

The display 330 may be operatively coupled with the processor 310.

The communication circuitry 340 may have various communication functions (for example, cellular communication, Bluetooth, NFC, Wi-Fi, etc.) for communication between the electronic device 120 and at least one external device (e.g., the wearable device 110). In other words, the communication circuitry 340 may establish communication between the electronic device 120 and the at least one external device.

The communication circuitry 340 may be operatively coupled with the processor 310.

In certain embodiments, the processor 310 may transmit a response to a request of the wearable device 110 received through the communication circuitry 340, to the wearable device 110 through the communication circuitry 340. For example, the response to the request of the wearable device 110 may include data about a screen which is regenerated with criterion of a second area of a display area of the display 250 of the wearable device 110. The data about the regenerated screen may be used to display the regenerated screen on the display area of the display 250 of the wearable device 110. For another example, the response to the request of the wearable device 110 may include data about a feedback of a user input obtained by the wearable device 110. The data about the feedback may alter a screen displayed on the display area of the display 250 of the wearable device 110. However, an embodiment is not limited to this.

Figure 11:
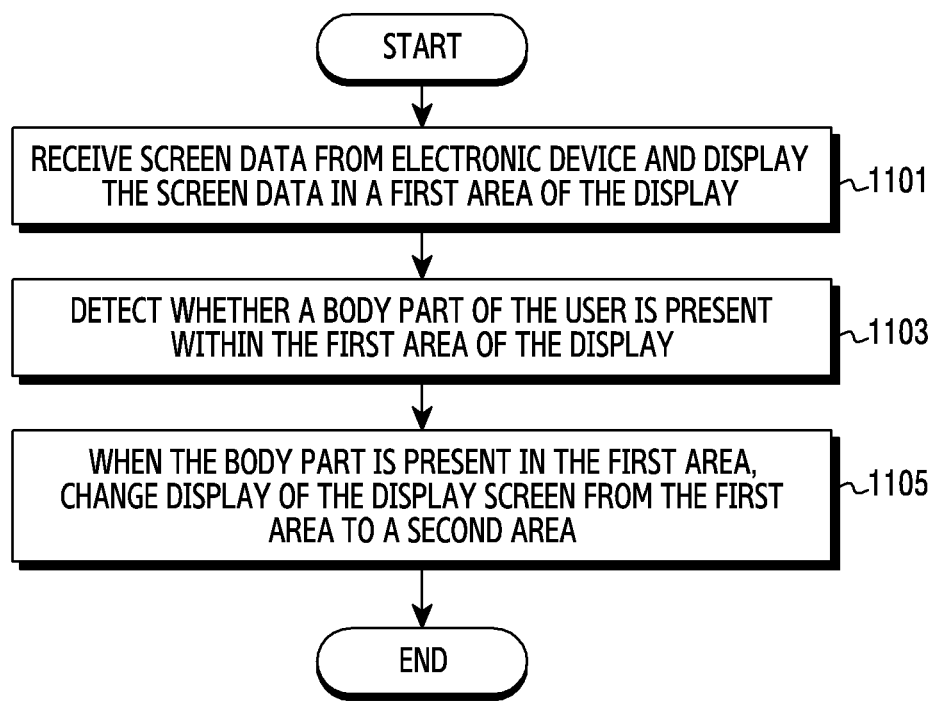
FIG. 11 illustrates an example of an operation of a wearable device according to certain embodiments.

FIG. 11 illustrates an example of an operation of a wearable device according to certain embodiments. This operation may be performed by the wearable device 110 shown in FIG. 1, the wearable device 110 shown in FIG. 2, or the processor 210 of the wearable device 110.

Referring to FIG. 11, in operation 1101, the processor 210 may receive data for a display screen (e.g., a small sub-screen to be displayed to a portion of a display, often less than a total area of the display) through the communication circuitry 240 from the electronic device 120. In certain embodiments, the processor 210 may receive the data through the communication circuitry 240, from the electronic device 120 (which may be held by the user in their hand). While the data is being received, the electronic device 120 may be viewed as included within a display area of at least one display (e.g., the display 250) of the wearable device 110 (e.g., based on the transparency of the at least one display, as implemented in an augmented reality environment). In certain embodiments, the data about the screen may be transmitted from the electronic device 120 to the wearable device 110, based on detecting that the wearable device 110 is worn by the user. For example, the wearable device 110 may send a request for the data about the screen to the electronic device 120 through the communication circuitry 240, based on identifying that the wearable device 110 is worn by the user through a sensor of the wearable device 110 or the camera 230, and identifying that the electronic device 120 gripped by the part of the body of the user is viewed in the display area of the at least one display through the camera 230. In response to the request of the wearable device 110, the electronic device 120 may transmit the data about the screen to the wearable device 110. For another example, while the electronic device 12 is used by the user, the electronic device 120 may receive a request for connection to the electronic device 120 from the wearable device 110 interlocked with the electronic device 120. In response to receiving the connection request, the electronic device 120 may transmit the data about the screen to the wearable device 110. However, an embodiment is not limited to this.

In operation 1103, while receiving the data, the processor 210 may identify, using the camera 230, that a first area within the total display area of the wearable display is occupied by a body part of the user holding the electronic device 120. For example, while receiving the data about the screen, the processor 210 may identify that the hand holding the electronic device 120 is included in the display area of the wearable display.

In operation 1105, in response to detecting the presence of the body part in the display area, the processor 210 may change display of the screen image to a second area of the display area different from the first area. For example, to prevent the screen image from being displayed in the first area which would overlap the body part of the user, the processor 210 may display the screen in the second area different from the first area. In certain embodiments, the second area may correspond to a remaining area excepting the first area in the display area. In certain embodiments, the arrangement of at least one virtual object included in the screen displayed in the second area may be identified based on a size of the at least one virtual object, an attribute of the at least one virtual object, content provided by the at least one virtual object, the kind of an application providing the at least one virtual object, a shape of the second area, a width of the second area, or a combination thereof. In certain embodiments, the arrangement of the at least one virtual object included in the screen displayed in the second area may be identified by the processor 210 independently from the electronic device 120 as well, and be identified by the electronic device 120 as well. In response to the arrangement of the at least one virtual object included in the screen displayed in the second area being identified by the electronic device 120, the electronic device 120 may transmit information about the arrangement of the at least one virtual object to the wearable device 110. However, an embodiment is not limited to this.

As described above, the wearable device 110 of certain embodiments may enhance the visibility of a screen, by restricting displaying the screen in a partial area of a display area occupied by part of the body of a user who grips the electronic device 120.

Figure 12:
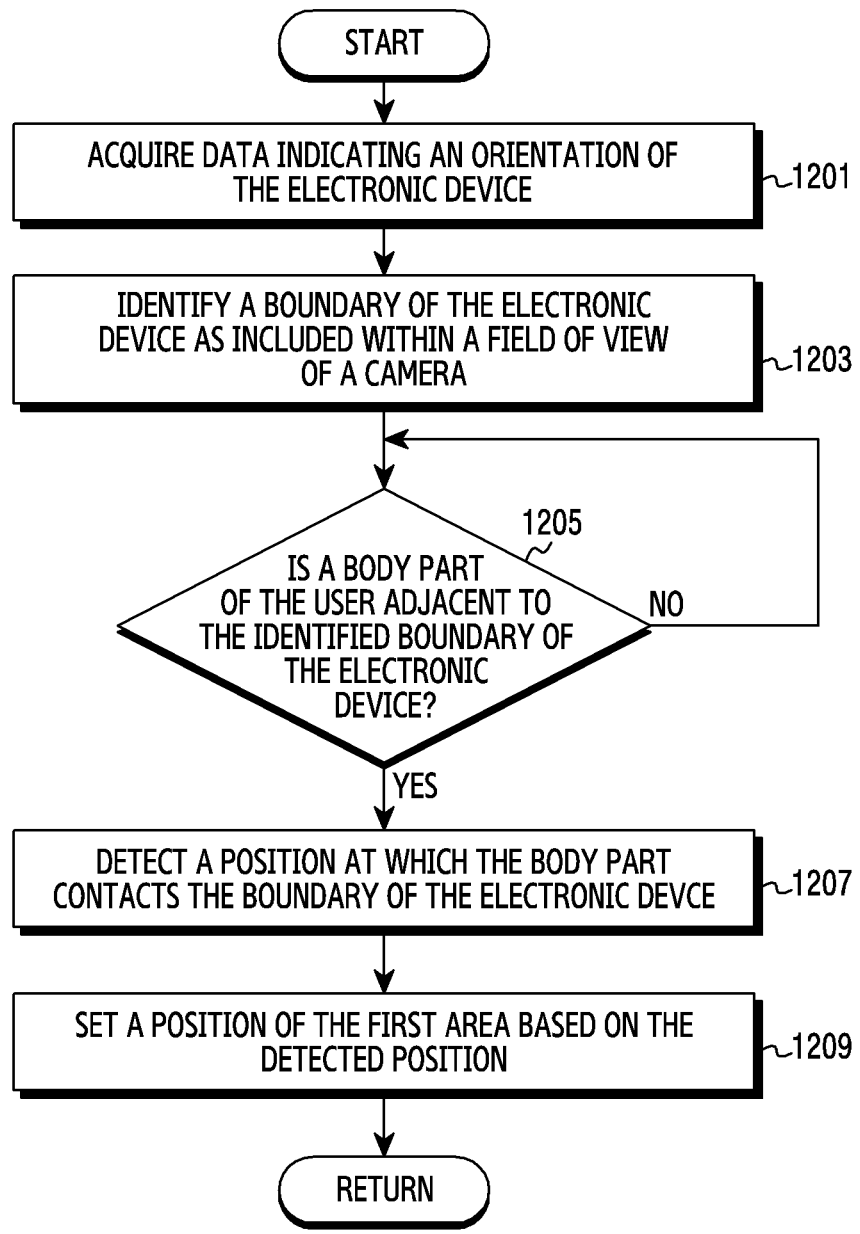
FIG. 12 illustrates an example of an operation of a wearable device of identifying a first area for restricting the displaying of a screen according to certain embodiments.

FIG. 12 illustrates an example of an operation of a wearable device of identifying a first area for restricting the displaying of a screen according to certain embodiments. This operation may be performed by the wearable device 110 shown in FIG. 1, the wearable device 110 shown in FIG. 2, or the processor 210 of the wearable device 110.

Operation 1201 to operation 1209 of FIG. 12 may be included in operation 1103 of FIG. 11.

Referring to FIG. 12, in operation 1201, the processor 210 may acquire data indicating an orientation of the electronic device 120. The data indicating the orientation of the electronic device 120 may be acquired through various methods. For example, the orientation data can be acquired by analyzing an image acquired through the camera 230 that includes a picture of the electronic device 120. For another example, the orientation data can be acquired by receiving the data pertaining to the screen through the communication circuitry 240 from the electronic device 120, through which the processor 210 may request the data about the orientation of the electronic device 120 from the electronic device 120 through the communication circuitry 240. In response to the request, the electronic device 120 may detect its orientation using at least one sensor (e.g., a proximity sensor, a gyro sensor, a geomagnetic sensor, etc.) of the electronic device 120, and transmit, as a response to the request, the data indicating the orientation of the electronic device 120 to the wearable device 110. The wearable device 110 may acquire the data about the orientation of the electronic device 120 through the communication circuitry 240 from the electronic device 120. However, an embodiment is not limited to this. In certain embodiments, the data about the orientation of the electronic device 120 may include data for indicating that the electronic device 120 is in a portrait mode (e.g., a vertical mode). In certain embodiments, the data about the orientation of the electronic device 120 may include data for indicating that the electronic device 120 is in a landscape mode (e.g., a horizontal mode) as well. However, an embodiment is not limited to this.

In operation 1203, the processor 210 may identify a boundary area of the electronic device 120 (e.g., detect edges of the electronic device as included in the display area) as visible within a field of view of at least one camera (e.g., the camera 230). For example, the processor 210 may identify a visual object corresponding to the electronic device 120 from an image acquired by the at least one camera. The processor 210 may identify a boundary area of the visual object from the obtained visual object. In response to a user gripping the electronic device 120, because the representation of the boundary area of the visual object corresponding to the electronic device 120 is altered due to the user's gripping, the processor 210 may identify the boundary area.

In operation 1205, the processor 210 may identify whether a body part of the user is disposed in an area adjacent to the identified boundary area. For example, the processor 210 may identify that the body part of the user is included in the area adjacent to the identified boundary area, based on detecting that the identified boundary area is visually altered (e.g., by intrusion of a thumb or other finger crossing the boundary-edge of the electronic device). In response to identifying that the part of the body of the user is not included in the area adjacent to the identified boundary area, the processor 210 may confirm whether the part of the body of the user is continuously disposed in the area adjacent to the identified boundary area. For example, while information about the screen is received from the electronic device 120 or while the display 250 is used to display the screen, the processor 210 may confirm whether the part of the body of the user is disposed in the area adjacent to the identified boundary area.

In operation 1207, the processor 210 may identify an area where the body part contacts the electronic device 120, based on identifying that the part of the body is disposed in the area adjacent to the boundary area. For example, when the body part in question is a hand, the processor 210 may identify an area where the hand contacts the electronic device 120, to identify which hand is the hand gripping the electronic device 120.

In operation 1209, the processor 210 may identify a first display area in which display of the screen is to be restricted, based on the identified area. For example, the processor 210 may identify which hand (e.g., right or left) is holding the electronic device 120, based on the distribution of the identified area. The processor 210 may then set a position of the first area, based on the identification of the right or left hand.

Although not illustrated in FIG. 12, the processor 210 may identify a second area of the display area of the display 250 for permitting the displaying of the screen, based on the identified first area. For example, the processor 210 may identify, as the second area, a remaining area excepting the first area in the display area of the display 250.

FIG. 12 illustrates an example in which, by directly processing an image, the wearable device 110 recognizes a state of part of the body of a user who grips the electronic device 120, but it should be noted that the operation of FIG. 12 may be performed by a server or another electronic device (e.g., the electronic device 120) as well. For example, the processor 210 may transmit information about an image acquired using the camera 230, to the server or the another electronic device through the communication circuitry 240, and receive information about the state of the part of the body of the user which is recognized based on the image, from the server or the another electronic device, and identify the first area by using the received information.

As described above, the wearable device 110 of certain embodiments may acquire, through the camera 230, an image including a visual object corresponding to the electronic device 120, and may identify the first area by analyzing the acquired image. Through the identifying of the first area, the wearable device 110 may enhance the visibility of the screen.

Figure 13:
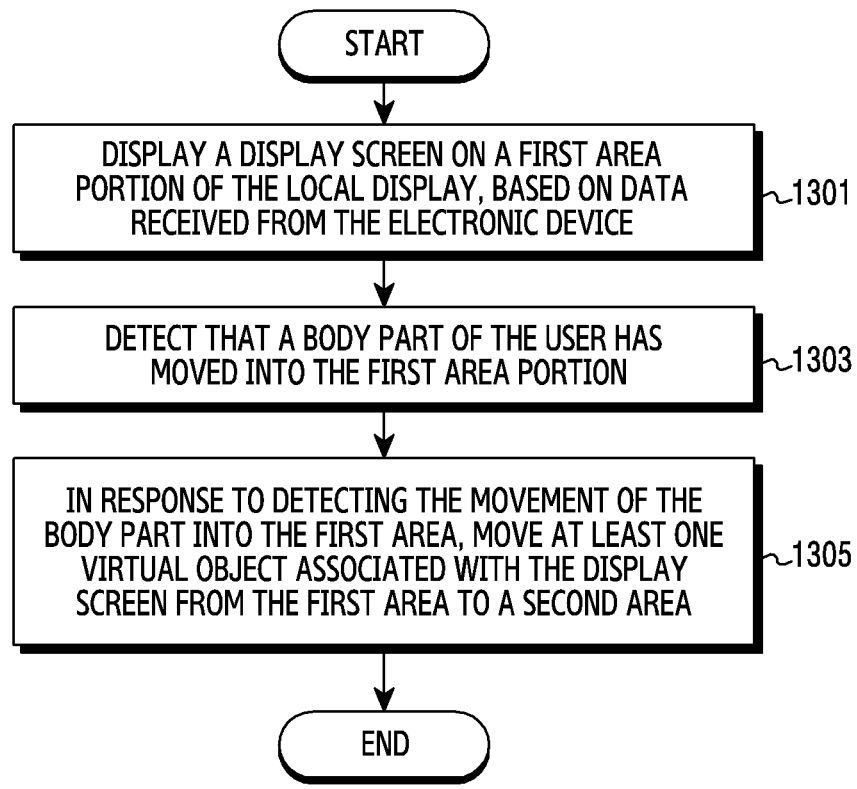
FIG. 13 illustrates another example of an operation of a wearable device according to certain embodiments.

FIG. 13 illustrates another example of an operation of a wearable device according to certain embodiments. This operation may be performed by the wearable device 110 shown in FIG. 1, the wearable device 110 shown in FIG. 2, or the processor 210 of the wearable device 110.

Referring to FIG. 13, in operation 1301, the processor 210 may display a screen on at least a part of a display area of at least one display (e.g., the wearable display 250) of the wearable device 110, generated based on data received from the electronic device 120. For example, while the screen is displayed on the at least part of the display area of the at least one display, at least one virtual object included in the screen may be displayed in a first area of the display area. In accordance with embodiments, at least one another virtual object distinct from the at least one virtual object may be further displayed in a third area different from the first area as well.

In operation 1303, the processor 210 may detect that a body part of a user holding the electronic device 120 has moved to the first area. For example, the processor 210 may obtain, by using at least one camera (e.g., the camera 230), that the part of the body is moved from the external of the display area of the display to the first area of the display area which is displaying the at least one virtual object. For another example, the processor 210 may obtain, by using the at least one camera, that the part of the body is moved from another area of the display area of the display to the first area of the display area which is displaying the at least one virtual object. However, an embodiment is not limited to this.

In operation 1305, in response to detecting the movement of the body part into the first area, the processor 210 may move the at least one virtual object from the first area to a second area to prevent overlap or obstruction of the virtual object by the body part. For example, the second area may be an area spaced apart from the part of the body. For another example, the second area may be an area which is spaced apart from the part of the body and is close to another part of the body distinct from the part of the body. For further another example, the second area may be an empty or blank area where no information is displayed. However, an embodiment is not limited to this. On the other hand, when the at least one another virtual object is displayed in the third area, displaying the at least one another virtual object in the third area may be maintained independently from the obtaining. For example, when the part of the body moved to the first area is spaced apart from the third area, the processor 210 may maintain displaying the at least one another virtual object in the third area, independently from the obtaining.

As described above, in response to estimating that the visibility of a virtual object displayed through the display 250 is deteriorated due to an external object such as part of the body, the wearable device 110 of certain embodiments may enhance the visibility of the virtual object by altering a position of the virtual object into an area spaced apart from the external object.

Figure 14:
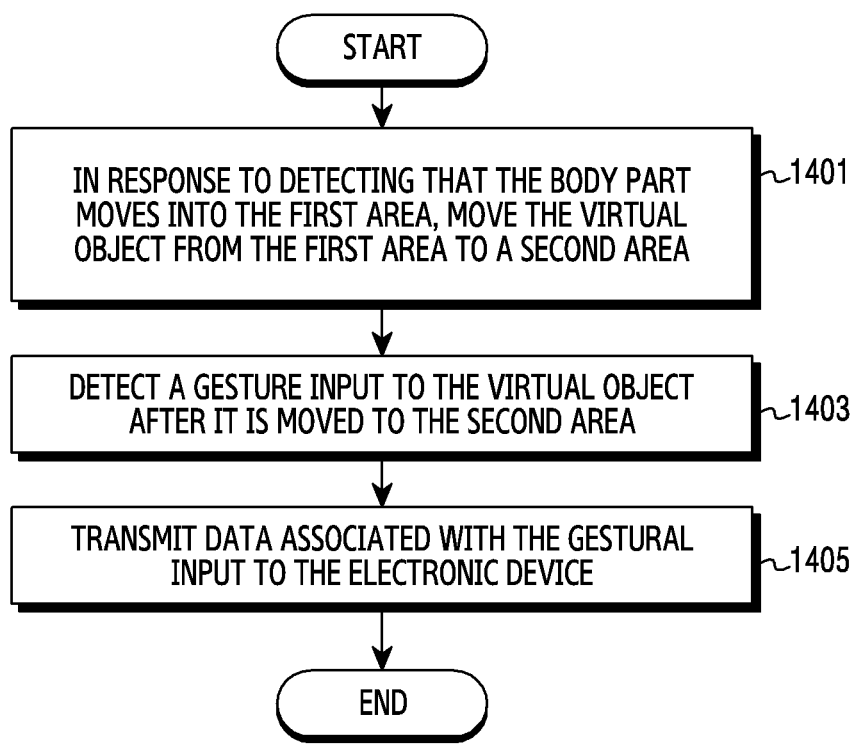
FIG. 14 illustrates an example of an operation of a wearable device of transmitting data about a gesture input to an electronic device according to certain embodiments.

FIG. 14 illustrates an example of an operation of a wearable device of transmitting data about a gesture input to an electronic device according to certain embodiments. This operation may be performed by the wearable device 110 shown in FIG. 1, the wearable device 110 shown in FIG. 2, or the processor 210 of the wearable device 110.

Operation 1401 to operation 1405 of FIG. 14 may be related to operation 1305 of FIG. 13.

Referring to FIG. 14, in operation 1401, in response to detecting that the body part moved to a first area, the processor 210 may move the at least one virtual object having been displayed in the first area to a second area. Operation 1401 may correspond to operation 1305 of FIG. 13.

In operation 1403, the processor 210 may receive a gesture input to the at least one virtual object after it is moved to the second area. For example, the processor 210 may receive the gesture input to the at least one virtual object using the camera 230. For example, the gesture input may include that part (e.g., the hand) of the body of a user stays on the at least one virtual object during a specified time. For another example, the gesture input may include that the part of the body is moved in a specified pattern on the at least one virtual object. For further another example, the gesture input may be an eye of a user who looks at the at least one virtual object during a specified time as well. However, an embodiment is not limited to this.

In operation 1405, the processor 210 may transmit data about the gesture input to the electronic device 120. For example, to provide feedback for the gesture input, the processor 210 may transmit data associated with the gesture input through the communication circuitry 240 to the electronic device 120. The electronic device 120 may provide or configure feedback for the gesture input, based on the received data about the gesture input, and transmit data about the provided or configured feedback to the wearable device 110. The processor 210 may receive the feedback data from the electronic device 120 through the communication circuitry 240 and, in response to the reception, may provide the feedback on the at least one display.

As described above, the wearable device 110 of certain embodiments may provide an intuitive user input by providing operations for providing a feedback of a gesture input based on the gesture input.

Figure 15:
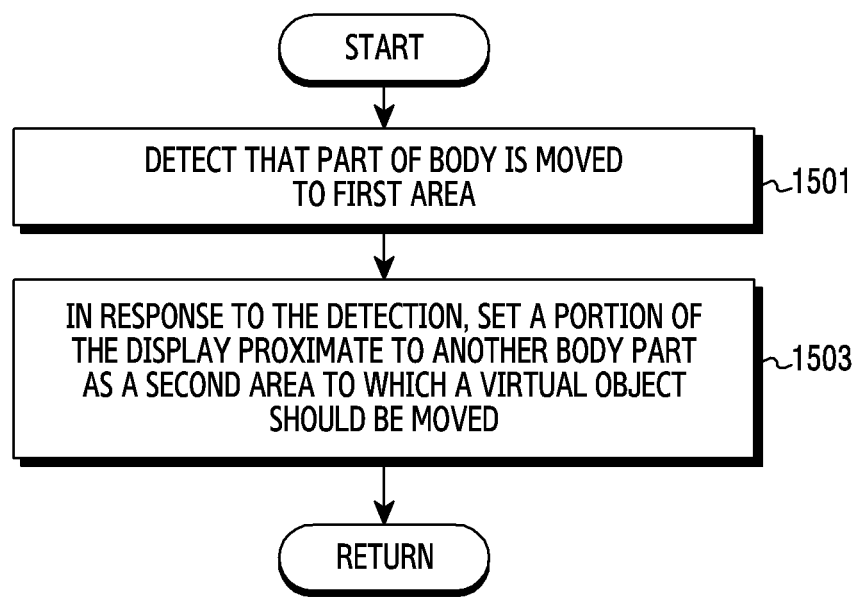
FIG. 15 illustrates an example of an operation of a wearable device of identifying a second area to which a virtual object is to be moved according to certain embodiments.

FIG. 15 illustrates an example of an operation of a wearable device of identifying a second area to which a virtual object will be moved according to certain embodiments. This operation may be performed by the wearable device 110 shown in FIG. 1, the wearable device 110 shown in FIG. 2, or the processor 210 of the wearable device 110.

Operations 1501 and 1503 of FIG. 15 may be related to operation 1303 of FIG. 13.

Referring to FIG. 15, in operation 1501, the processor 210 may detect that body part is moved to a first area. Operation 1501 may correspond to operation 1303.

In operation 1503, in response to the obtaining, the processor 210 may identify a partial area of a display area close to another body part, as a second area to which the virtual object is to be moved. For example, when the part of the body is one hand and the another part of the body is the other hand, the processor 210 may identify the partial area of the display area close to the other hand, as the second area. Due to the fact that the electronic device 120 is gripped by the part of the body, a probability in which a user input is triggered by the another part of the body is high, so the processor 210 may identify the partial area of the display area close to the other hand, as the second area.

As described above, the wearable device 110 of certain embodiments may enhance a convenience, by arranging a virtual object in a position capable of easily triggering an input.

Figure 16:
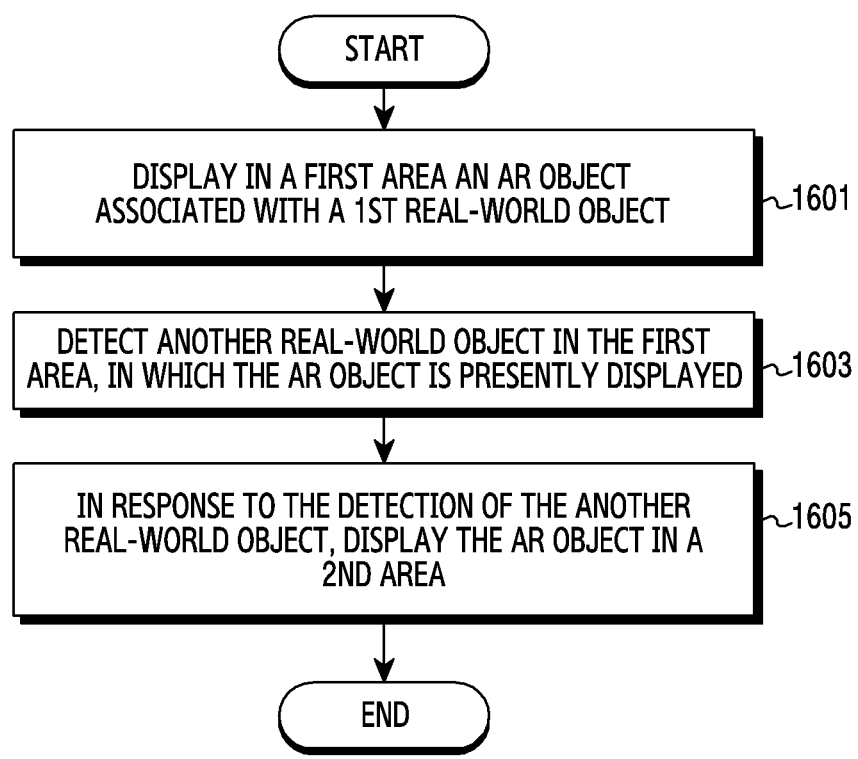
FIG. 16 illustrates a further another example of an operation of a wearable device according to certain embodiments.

FIG. 16 illustrates a further another example of an operation of a wearable device according to certain embodiments. This operation may be performed by the wearable device 110 shown in FIG. 1, the wearable device 110 shown in FIG. 2, or the processor 210 of the wearable device 110.

Referring to FIG. 16, in operation 1601, the processor 210 may display an augmented reality (AR) object associated with a first real-world external object viewed in a display area of the display 250, on a first area of the display area. For example, the AR object may mean an object which is displayed together with an external object residing in the real world and which is for providing information related with the external object or supplementary information about the external object. For another example, the AR object may be an object which is identified based on a recognition result of a visual object corresponding to the external object.

In operation 1603, the processor 210 may detect another real-world external object distinct from the first real-world external object, in the first area in which the AR object is displayed. For example, the another external object may be an external object which newly enters the display area of the display 250. For another example, the another external object may be an object residing in the display area of the display 250 in a position spaced apart from the external object as well. However, an embodiment is not limited to this. The processor 210 may obtain the another external object in the first area, by using the camera 230.

In operation 1605, in response to the detection of the another real-world external object, the processor 210 may change display the AR object to a second area from the first area. For example, the second area may be an area which is adjacent to the external object and is spaced apart from the another external object. For example, the AR object may be displayed on the second area as associated with the external object.

As described above, while operating independently from the electronic device 120, while displaying an AR object as associated with an external object viewed in a display area of the display 250, the wearable device 110 may monitor whether the condition of deteriorating the visibility of the AR object occurs, and in response to monitoring that the condition of deteriorating the visibility of the AR object occurs, may alter a position of the AR object, thereby enhancing the visibility of the AR object.

Figure 17:
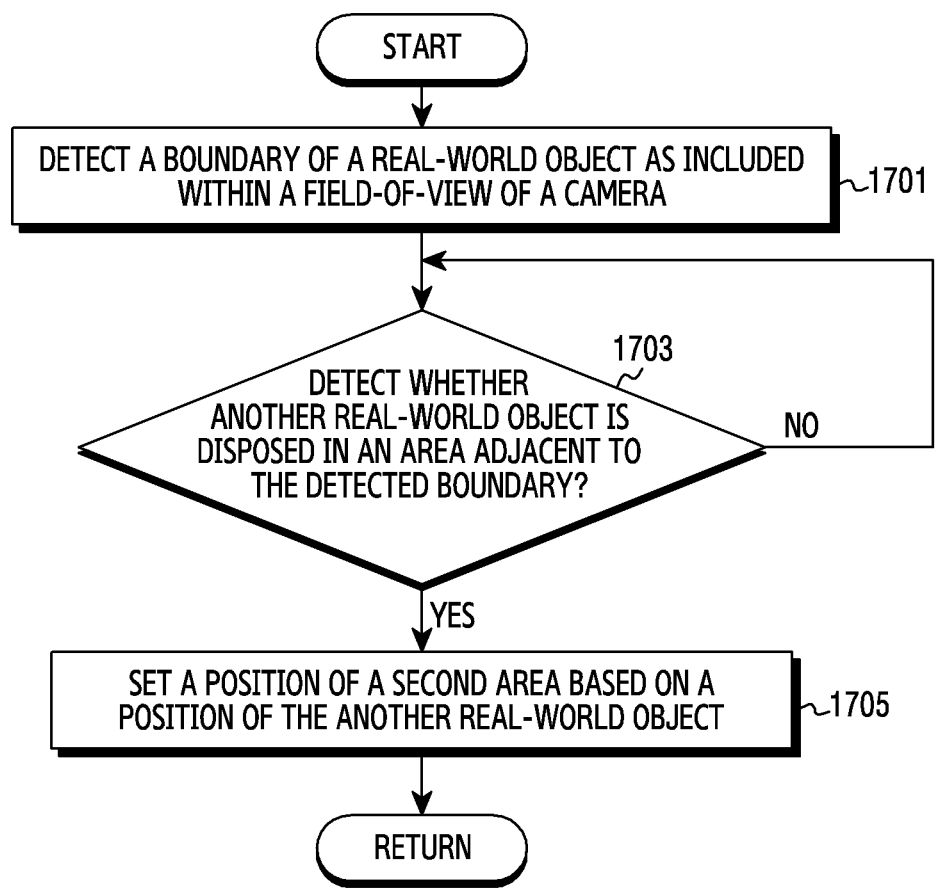
FIG. 17 illustrates an example of an operation of a wearable device of identifying a second area according to certain embodiments.

FIG. 17 illustrates an example of an operation of a wearable device of identifying a second area according to certain embodiments. This operation may be performed by the wearable device 110 shown in FIG. 1, the wearable device 110 shown in FIG. 2, or the processor 210 of the wearable device 110.

Operations 1701 to 1703 of FIG. 17 may be related with or be included in operation 1605 of FIG. 16.

Referring to FIG. 17, in operation 1701, the processor 210 may detect a boundary area of an AR object (e.g., the edge of a smartphone) as included within a field of view of the at least one camera 230. For example, the processor 210 may identify the boundary area of the AR object based on coordinate information of an area of displaying the AR object.

In operation 1703, the processor 210 may detect whether another external real-world object is disposed adjacent to the identified boundary area. For example, to stop the condition of deteriorating the visibility of the AR object, the processor 210 may confirm whether the another external object is positioned in the area adjacent to the identified boundary area. Operation 1703 may be maintained while the AR object is displayed.

In operation 1705, based on detect that the another real-world external object is disposed adjacent to the boundary area, the processor 210 may set a second area based on the position of the another real-world external object. For example, to display the AR object in a position spaced apart from the another external object, the processor 210 may identify an area capable of indicating an association with the external object, in a remaining area excepting the position of the another external object, and identify the identified area as the second area.

As described above, by processing an image, the wearable device 110 of certain embodiments may prevent the deterioration of the visibility of an AR object which is being displayed.

A wearable device interlocking with an electronic device of certain embodiments as described above may include at least one display configured to enable external light going toward a first surface of the at least one display to go through a second surface opposite to the first surface, and configured to display information on the second surface, a memory storing instructions, a communication circuitry, and at least one processor. The at least one processor may be configured to, when executing the instructions, receive data about a screen, through the communication circuitry, from the electronic device gripped by part of the body of a user, and while receiving the data about the screen, identify that a first area of a display area of the at least one display is hidden by the part of the body by using the at least one camera, and in response to the identifying, display the screen in a second area of the display area different from the first area.

In certain embodiments, the at least one processor may be configured to, when executing the instructions, while receiving the data about the screen, display, in the first area, at least one virtual object included in the screen, and while displaying the at least one virtual object in the first area, identify that the first area is hidden by the part of the body, by using the at least one camera, and in response to the identifying, display the screen in the second area by moving the at least one virtual object from the first area to the second area.

In certain embodiments, the at least one processor may be further configured to, when executing the instructions, acquire data about an orientation of the electronic device gripped by the part of the body, by using the at least one camera, and in response to the identifying, the second area may be identified based on the data about the orientation of the electronic device.

In certain embodiments, the at least one processor may be further configured to, when executing the instructions, receive data about an orientation of the electronic device through the communication circuitry from the electronic device, and in response to the identifying, the second area may be identified based on the data about the orientation of the electronic device.

In certain embodiments, the at least one processor may be configured to, when executing the instructions, acquire data about an orientation of the electronic device by using the at least one camera, identify a boundary area of the electronic device based on the data about the orientation, identify, from the boundary area, an area where the part of the body gripping the electronic device comes in contact with the electronic device, and identify the first area based on the identified area. In certain embodiments, the at least one processor may be further configured to, when executing the instructions, first search for the part of the body in an area adjacent to the boundary area among the entire area covered by a field of view of the at least one camera, and identify the area where the part of the body comes in contact with the electronic device, based on the searching.

In certain embodiments, the second area may correspond to a remaining area excepting the first area in the display area.

A wearable device interlocking with an electronic device of certain embodiments as described above may include at least one display configured to enable external light going toward a first surface of the at least one display to go through a second surface opposite to the first surface, and configured to display information on the second surface, at least one camera, a memory storing instructions, a communication circuitry, and at least one processor. The at least one processor may be configured to, when executing the instructions, display a screen on at least part of a display area of the at least one display based on data received from the electronic device gripped by part of the body of a user, at least one virtual object included in the screen being displayed in a first area of the display area, and while displaying the screen on the at least part of the display area, obtain that the part of the body is moved to the first area by using the at least one camera, and in response to the obtaining, move the at least one virtual object from the first area to a second area of the display area.

In certain embodiments, the screen may further include at least one another virtual object displayed in a third area different from the first area while the at least one virtual object is displayed in the first area, and the at least one processor may be further configured to, when executing the instructions, maintain to display the at least one another virtual object in the third area independently from the obtaining.

In certain embodiments, the at least one processor may be configured to, when executing the instructions, move the at least one virtual object form the first area to the second area and restrict displaying a part of the screen in the first area.

In certain embodiments, the at least one processor may be configured to, when executing the instructions, while displaying the screen including the at least one object moved to the second area, receive a gesture input to the at least one object by using the at least one camera, and in response to the receiving of the gesture input, transmit data about the gesture input to the electronic device through the communication circuitry. In certain embodiments, the gesture input may be triggered by another part of the body of the user distinct from the part of the body gripping the electronic device. In certain embodiments, the at least one processor may be configured to, when executing the instructions, in response to the obtaining, identify, as the second area, a partial area of the display area close to the another part of the body, and move the at least one virtual object from the first area to the identified second area. In certain embodiments, the part of the body may correspond to the hand of the user, and the another part of the body may correspond to the other hand of the user, and a distance between the second area and the other hand may be shorter than a distance between the first area and the other hand.

A wearable device of certain embodiments as described above may include at least one display configured to enable external light going toward a first surface of the at least one display to go through a second surface opposite to the first surface, and configured to display information on the second surface, at least one camera, a memory storing instructions, and at least one processor. The at least one processor may be configured to, when executing the instructions, display an augmented reality (AR) object of an external object viewed in a display area of the at least one display, on a first area of the display area, obtain another external object distinct from the external object in the first area of displaying the AR object, by using the at least one camera, and in response to the obtaining, display the AR object, as associated with the external object, on a second area of the display area altered from the first area. In certain embodiments, the at least one processor may be configured to, when executing the instructions, identify a boundary area of the external object, and while displaying the AR object of the external object in the first area, confirm whether a state of the boundary area is altered, and in response to confirming that the state of the boundary area is altered, confirm whether the another external object is positioned in an area adjacent to the boundary area among the entire area covered by a field of view of the at least one camera, and in response to confirming that the another external object is positioned in the area adjacent to the boundary area, identify the second area based on the position of the another external object. In certain embodiments, the second area may be an area adjacent to the external object, and may be an area spaced apart from the another external object.

In certain embodiments, the AR object may be identified based on a recognition result of a visual object corresponding to the external object. In certain embodiments, the at least one processor may be configured to, when executing the instructions, acquire an image including the visual object corresponding to the external object by using the at least one camera, recognize the visual object included in the acquired image, identify the AR object of the external object, based on the recognition result of the visual object; and display the identified AR object in the first area. In certain embodiments, the wearable device may further include a communication circuitry, and the at least one processor may be configured to, when executing the instructions, acquire the image including the visual object corresponding to the external object by using the at least one camera, transmit information about the acquired image to an external electronic device, receive information about the AR object which is identified based on the recognition result of the visual object included in the acquired image, through the communication circuitry from the external electronic device, and display the identified AR object in the first area.

By altering a display position of a virtual object adaptively according to a position of an external object, a wearable device of certain embodiments and an operation method thereof may enhance the visibility of the virtual object.

Effects which can be acquired by the disclosure are not limited to the above described effects, and other effects that have not been mentioned may be clearly understood by those skilled in the art from the following description.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to certain embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access a device that performs an embodiment of the disclosure via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and certain embodiments of the disclosure are not limited to a single element or multiple elements thereof. Further, either multiple elements expressed in the description may be configured into a single element or a single element in the description may be configured into multiple elements.

While the disclosure has been shown and described with reference to certain embodiments thereof, it will be understood by those skilled in the art that various changes in form and details may be made therein without departing from the disclosure. Therefore, the disclosure should not be defined as being limited to the embodiments, but should be defined by the appended claims and equivalents thereof.

What is claimed is:

1. A wearable device interoperating with an electronic device, the wearable device comprising:
   at least one display including a first surface and a second surface opposite the first surface, wherein external light entering the first surface passes out the second surface, and wherein the at least one display is configured to display information on the second surface;
   at least one camera;
   communication circuitry;
   a memory storing instructions; and
   at least one processor, wherein the instructions are executable by the at least one processor to cause the wearable device to:
     receive, through the communication circuitry, screen data from the electronic device and displaying the screen data in a first area of the at least one display;
     while receiving the screen data, detect, using the at least one camera, a presence of a body part holding the electronic device within a field of view of the at least one camera and determine whether the presence of the body part overlaps the first area;
     in response to detecting overlap of the first area, display the screen data to a second area of the at least one display different from the first area.

2. The wearable device of claim 1, wherein displaying the screen data includes displaying at least one virtual object in the first area, and
   wherein displaying the screen data to the second area includes moving the at least one virtual object from the first area to the second area, when detecting that the presence of the body part overlaps the first area including the at least one virtual object.

3. The wearable device of claim 1, wherein the instructions are further executable by the at least one processor to cause the wearable device to:
   detect an orientation of the electronic device using the at least one camera,
   wherein the second area is set based at least in part on the detected orientation.

4. The wearable device of claim 1, wherein the instructions are further executable by the at least one processor to cause the wearable device to:
   receive orientation data indicating an orientation of the electronic device through the communication circuitry from the electronic device,
   wherein the second area is set based at least in part on the received orientation data.

5. The wearable device of claim 1, wherein the instructions are further executable by the at least one processor to cause the wearable device to:
   acquire orientation data indicating an orientation of the electronic device using the at least one camera;
   identify a boundary area of the electronic device based at least in part on the orientation data;
   identify a part of the boundary area where the body part contacts the electronic device; and
   identify the first area based on the identified part of the boundary area.

6. The wearable device of claim 5, wherein identifying the part of the boundary area where the body part contacts the electronic device further includes:
   analyzing areas adjacent to the boundary area along edges of the electronic device captured within the field of view of the at least one camera.

7. The wearable device of claim 1, wherein the second area includes a remaining display area of the at least one display excepting the first area.

8. A wearable device interoperating with an electronic device, comprising:
   at least one display including a first surface and a second surface opposite the first surface, wherein external light entering the first surface passes out the second surface, and wherein the at least one display is configured to display information on the second surface;
   at least one camera;
   a memory storing instructions;
   a communication circuitry; and
   at least one processor,
   wherein the instructions are executable by the at least one processor to cause the wearable device to:
     display a screen in a first area of the at least one display, the displayed screen including at least one virtual object and generated based on screen data received from the electronic device through the communication circuitry;
     while displaying the screen, detect whether a body part holding the electronic device and captured by the least one camera moves into the first area; and
     based on detecting the body part moving into the first area, move the at least one virtual object from the first area to a second area of the at least one display.

9. The wearable device of claim 8, wherein the screen further includes at least one other virtual object displayed in a third area different from the first area, the at least one other virtual object displayed while the at least one virtual object is displayed in the first area, and
   wherein the instructions are further executable by the at least one processor to cause the wearable device to:
     maintain display of the at least one other virtual object in the third area when the body part is detected as moving into the first area.

10. The wearable device of claim 8, wherein the at least one virtual object is moved from the first area to the second area to restrict display of a part of the screen in the first area.

11. The wearable device of claim 8, wherein the instructions are further executable by the at least one processor to cause the wearable device to:
  after moving the at least one virtual object to the second area, receive a gesture input to the at least one virtual object by the at least one camera; and
  in response to the gesture input, transmit data for the gesture input to the electronic device through the communication circuitry.

12. The wearable device of claim 11, wherein detection of the gesture input includes detecting, by the at least one camera, movement of another body part distinct from the body part holding the electronic device.

13. The wearable device of claim 12, wherein the instructions are further executable by the at least one processor to cause the wearable device to:
  in response to detecting the body part moving into the first area, set part of the at least one display close to the another body part as the second area.

14. The wearable device of claim 13, wherein the body part includes a hand of a user, the another part of the body includes another hand of the user, and a distance between the second area and the another hand is shorter than a distance between the first area and the another hand.

15. A wearable device, comprising:
  at least one display including a first surface and a second surface opposite the first surface, wherein external light entering the first surface passes out the second surface, and wherein the at least one display is configured to display information on the second surface;
  at least one camera;
  a memory storing instructions; and
  at least one processor,
  wherein the instructions are executable by the at least one processor to cause the wearable device to:
    detect, via the at least one camera, a first external object,
    display an augmented reality (AR) object on a first area of the at least one display, the AR object associated with the first external object visible through the at least one display;
    identify a boundary area of the first external object,
    while displaying the AR object in the first area, detect whether the boundary area is visually altered by another external object disposed adjacent to the boundary area, as detected within a field of view of the at least one camera,
    in response to detecting that the another external object is disposed in the area adjacent to the boundary area, set a second area of the at least one display based on a position of the another external object, and
    display the AR object associated with the first external object on the second area of the at least one display.

16. The wearable device of claim 15, wherein the second area is adjacent to the first external object, and spaced apart from the another external object.

17. The wearable device of claim 15, wherein the AR object is selected for display based on an association with the first external object.

18. The wearable device of claim 17, wherein the instructions are executable by the at least one processor to cause the wearable device to:
  acquire an image including the first external object using the at least one camera;
  execute visual recognition of the first external object as depicted in the acquired image;
  based on the executed visual recognition, identify the AR object for display based on a pre-association with the first external object.

19. The wearable device of claim 17, further comprising a communication circuitry,
  wherein the instructions are executable by the at least one processor to cause the wearable device to:
    acquire an image including the first external object using the at least one camera;
    transmit the acquired image to an external electronic device, using the communication circuitry;
    receive information for displaying the AR object from the external electronic device from the external electronic device through the communication circuitry, the AR object identified by the external electronic device by executing visual recognition on the first external object included in the acquired image.

* * * * *